(12) United States Patent
Erlanger

(10) Patent No.: US 8,560,421 B1
(45) Date of Patent: Oct. 15, 2013

(54) METHOD AND APPARATUS FOR CONTINUOUS REVALUATION OF CONTRACTS

(75) Inventor: Michael David Erlanger, Westport, CT (US)

(73) Assignee: Marketcore.com, Inc., Greenwich, CT (US)

( * ) Notice: Subject to any disclaimer, the term of this patent is extended or adjusted under 35 U.S.C. 154(b) by 0 days.

(21) Appl. No.: 12/870,354

(22) Filed: Aug. 27, 2010

Related U.S. Application Data

(63) Continuation-in-part of application No. 12/536,197, filed on Aug. 5, 2009, which is a continuation of application No. 12/419,163, filed on Apr. 6, 2009, now abandoned.

(60) Provisional application No. 61/072,966, filed on Apr. 4, 2008, provisional application No. 61/256,736, filed on Oct. 30, 2009.

(51) Int. Cl.
*G06Q 40/00* (2012.01)

(52) U.S. Cl.
USPC ........................................ 705/36 R

(58) Field of Classification Search
USPC ........................................ 705/35–45
See application file for complete search history.

(56) References Cited

U.S. PATENT DOCUMENTS

| | | | |
|---|---|---|---|
| 6,594,635 B1 * | 7/2003 | Erlanger | 705/4 |
| 7,885,883 B2 * | 2/2011 | Laks et al. | 705/36 R |
| 8,244,628 B1 * | 8/2012 | Williams et al. | 705/38 |
| 2003/0009408 A1 * | 1/2003 | Korin | 705/36 |
| 2003/0055778 A1 | 3/2003 | Erlanger | |
| 2003/0200125 A1 | 10/2003 | Erlanger | |
| 2009/0240609 A1 * | 9/2009 | Cho et al. | 705/30 |

OTHER PUBLICATIONS

U.S. Dept. Of Treasury, "Review by the Treasury Department of the Regulatory Structure Associated with Financial Institutions," Federal Register, No. 72, Oct. 17, 2007, p. 58939.
King; "The Homeowners' Defense Act: An Overview"; CRS Report for Congress; Order Code RS22756; Nov. 13, 2007; 6 pages.

* cited by examiner

*Primary Examiner* — Thomas M Hammond, III
(74) *Attorney, Agent, or Firm* — St. Onge Steward Johnston & Reens LLC

(57) ABSTRACT

Disclosed is a system and method for the real-time evaluation of financial instruments such as contracts. When a financial instrument is created, all risks associated with the instrument are entered into the system and updated as necessary. This way, any participant in the system has the same access to the risk factors and valuation of the instrument. This increases liquidity and tracks risks and associated values even as derivative instruments are created.

29 Claims, 5 Drawing Sheets

METHOD AND APPARATUS FOR CONTINUOUS REVALUATION OF CONTRACTS

CROSS-REFERENCE TO RELATED APPLICATIONS

This application is a continuation-in-part of U.S. patent application Ser. No. 12/536,197 filed Aug. 5, 2009, entitled "Apparatus and Method for Risk Disclosure and Analysis," which is a continuation of U.S. patent application Ser. No. 12/419,163 filed Apr. 6, 2009 now abandoned, entitled "Apparatus And Method For Risk Disclosure And Analysis," which claims the benefit under 35 U.S.C. §119(e) of U.S. Provisional Patent Application Ser. No. 61/072,966 filed on Apr. 4, 2008, the disclosures of which are hereby incorporated by reference in their entirety. This application claims the benefit under 35 U.S.C. §119(e) of U.S. Provisional Patent Application Ser. No. 61/256,736 filed on Oct. 30, 2009 and entitled "Component Analysis of Pooled Securities."

This application is related in subject matter to:

U.S. patent application Ser. No. 09/178,400, filed Oct. 24, 1998, entitled "A Data Processing System for Providing an Efficient Market for Loans and Lines of Credit" (now abandoned) which is incorporated by reference;

U.S. patent application Ser. No. 09/296,573, filed Apr. 22, 1999, (now issued as U.S. Pat. No. 6,594,635) entitled "A Data Processing System for Providing an Efficient Market for Insurance and Reinsurance," which is also incorporated by reference;

U.S. patent application Ser. No. 09/370,619, filed Aug. 7, 1999, (now issued as U.S. Pat. No. 7,742,966) entitled "Efficient Market for Financial Products," which is also incorporated by reference;

U.S. patent application Ser. No. 10/427,519, filed May 1, 2003, entitled "Data Processing System For Providing An Efficient Market For Insurance And Reinsurance," which is also incorporated by reference;

U.S. Provisional Patent Application No. 61/072,966 filed Apr. 4, 2008, the disclosure of which is hereby incorporated by reference; and U.S. patent application Ser. No. 12/536,197 filed Aug. 5, 2009, the disclosure of which is hereby incorporated by reference.

FIELD OF THE INVENTION

The invention relates to financial markets and, more particularly, to a system and method for disclosing risks related to financial instruments such as contracts, tracking the financial instruments and their individual risk elements, and valuing the financial instruments.

BACKGROUND OF THE INVENTION

The financial marketplace consists of numerous products that have evolved out of the most basic designations of equity and debt. Product specialization has resulted in linguistic and semantic differences, similar to those that can be found in different national languages in the world's countries. The transactional conventions and methodologies for scoring and rating the products that are associated with these differences can result in real price and term discontinuities, just as they appear in society as different approaches with different meanings. As is well known to those in the trade, it is possible through one kind of financial engineering or another to change high risk assets into low risk ones through various kinds of aggregation, diversification, hedging and division of risk. As a result, a single C risk can be re-configured into a product that appears to have AAA-risk characteristics. Of course, the individual asset retains the same characteristic that it always had; it is the pooled, re-configured and financially re-engineered aggregation of products that is measured differently. The difference is most easily seen as the analysis becomes increasingly granular. The disease in the form of a potentially toxic alignment of risk elements that might occur in either a singular or complex alignment of risks that might infect one class or sub-class of assets may not necessarily spread to the whole—and, then again, it might, thereby creating a systemic risk. The financial world has now seen how this result can play out to disrupt the entire marketplace in the subprime mortgage crisis of 2007-2008. This is a clear example of a financial "perfect storm".

Therefore, it would be beneficial to have a superior method and an apparatus for continuous reevaluation of contracts that evidence financial risks.

SUMMARY OF THE INVENTION

The needs set forth herein as well as further and other needs and advantages are addressed by the present embodiments, which illustrate solutions and advantages described below.

The system of the present embodiment includes, but is not limited to, a database, instrument creating software executing on a computer readable medium for creating a financial instrument and storing it in the database, risk creating software executing on a computer readable medium for creating a risk and storing it in the database, risk associating software executing on a computer readable medium for associating a risk with a financial instrument, and risk updating software executing on a computer readable medium for updating a risk. Evaluation software executing on a computer readable medium can evaluate the value of a financial instrument based at least in part on any associated risks.

The method of the present embodiment includes, but is not limited to, the following steps: creating a financial instrument; creating a risk; associating a risk with a financial instrument; updating information on a particular risk; and evaluating the value of a financial instrument based at least in part on any of the associated risks or risk elements.

Other embodiments of the system and method are described in detail below and are also part of the present teachings.

For a better understanding of the present embodiments, together with other and further aspects thereof, reference is made to the accompanying drawings and detailed description, and its scope will be pointed out in the appended claims.

DETAILED DESCRIPTION OF THE INVENTION

Figure 1:
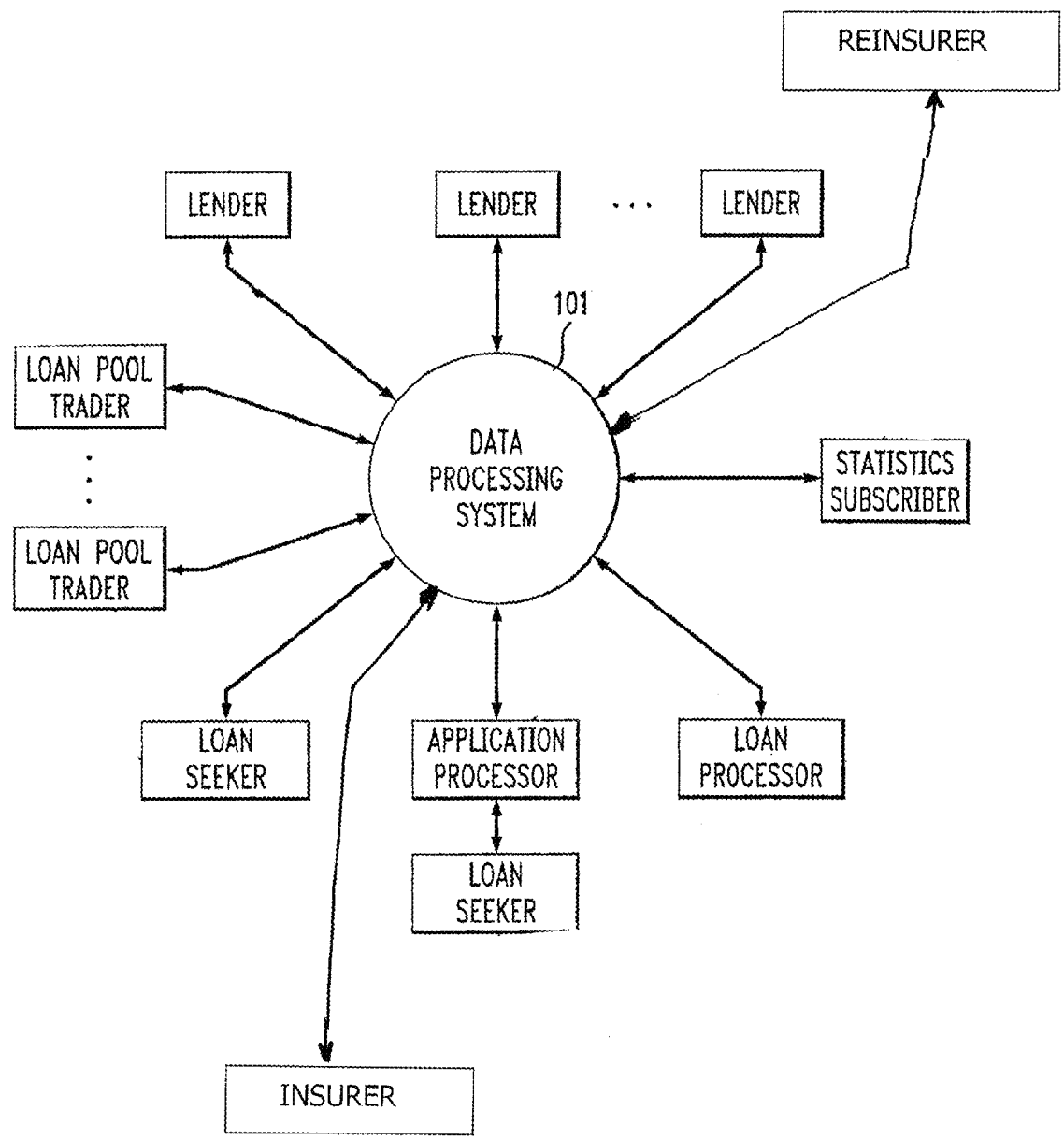
FIG. 1 is a schematic diagram of a data processing system in accordance with the invention.

The present teachings are described more fully hereinafter with reference to the accompanying drawings, in which the present embodiments are shown. The following description is presented for illustrative purposes only and the present teachings should not be limited to these embodiments. Any computer configuration and architecture satisfying the speed and interface requirements herein described may be suitable for implementing the system and method of the present embodiment.

If one were creating banking, insurance and capital markets business models anew, one would not be using models that are conceptually grounded in the 18th to 20th centuries. One would instead focus on 21st century technology and this nation's proven strengths in market creation. This country has long been esteemed for free markets, resilience, and innovation. The current breakdown in finance provides the opportunity to update structures and practices and to utilize current technology in devising a solution that supports growing dynamic financial and commercial markets.

The current business model for regulation of insurers requires regulators to rely on financial statements made by insurers that provide a snapshot of the insurer's financial position as of an historical date. Worse, invested assets (while they may reference marks to market) are judged as if they will be held to a maturity and redeemable at par. In fact, in economic crisis, large numbers of claims, particularly combine with policy loans and various insured rates of return could force insurers to sell assets at a significant discount to par value. If the insurer's management does not completely understand the risks they have assumed or the value of the assets they have secured, the financial statements they make will be deficient. Regulators can only discover the information was flawed at a later date or during a financial audit. The invention is a better way to gather information about the insurer's (or lender's) financial position and its market practices deploying a methodology that demonstrably supports the necessary market clarity. In addition, this same technology will benefit policyholders by making key information, available through competitively targeted and appropriate policy terms and conditions that actually do cover the risks that the person wishes to transfer to the insurer, necessary to arrive at a competitive and or appropriate secondary market price or valuation.

Knowledge is the essential tool for all regulation. Regulators cannot regulate that which they do not know. Therefore, regulators must have access to as much information as regulators deem necessary to do their job—not access only to that information that the regulated entities choose to make available.

Under US accounting standards, different industries use different methods of accounting. It is clear that, no matter what the accounting methodology used to value assets is, if it is allowed to continue unchanged, it will continue to be insufficient to properly alert regulators about the deterioration in the value of insurance or mortgage market assets—the most advanced of all the loan markets. There is much to be learned from this experience. The system disclosed herein is accepting to any accounting regime or valuation methodology, retaining cross-disciplinary skills.

One aspect is that our present rules require us to reference old information. Old information can only be a lagging indicator, which is useless in volatile markets—because excessive moves in markets drive values way up or down. One of the nation's leading authorities flagged the results of the current methods in surveys. A relatively recent Grant Thornton study of controllers and CFOs showed that "less than 15% (14.18%) say they plan on making use of the fair value option." A similar survey of this same group shows that 62.44% believe it would be possible to "intentionally misstate their financial statement to their auditor". The reality of these two samplings, combined with the current financial crisis, forces those who think in terms of value, keep the nation's books, and regulate our financial markets to reconsider the wisdom of using past-referenced valuations in the face of rapidly changing current and future values.

The invention inherently changes this disconnect in value perception by updating all of the definitions of financial products in real time, inherently supporting proper market clarification, transparency, full disclosure of price and terms—with continuous re-pricings.

In accordance with the invention, financial market products where there are a first sector for origination of the financial products (such as sale of insurance, or making of loans to borrowers) and a second sector for resale (or chains of resales) of a fractional interest or entire interest of the insurer or lender in the financial product, data is captured in the course of each transaction involving the creation or subsequent intermediation or transfer of financial products. The data is recorded in a data storage system so that each financial product and each risk element and related subsequent transaction involving that financial product are described, time stamped, identified with indicia, with the conversion/pull-through rate noted at each work or process flow point in a data report that discloses that original terms of the financial product and its value, and changed terms of the of the financial product and its value arising from external events or from the subsequent transactions. The data report is provided in a predefined standard format and can be continuously updated with new, relevant information.

The data report is offered for sale to parties that conduct transactions in the two sectors, and can be made available to government regulators. The pricing of data is offered under a pricing schedule providing reductions in the price of the information which is related to the amount of information delivered to the system by the user, and/or to fees paid for services such as intermediation services provided to the user.

During application processes for financial products, including specifically, consumer-directed financial products, including but not limited to life insurance, annuities, medical insurance, homeowner's insurance, renter's insurance, automobile insurance, secured loans, mortgages, home equity loans, automobile loans, personal loans or lines of credit and unsecured loans, and credit card revolving loans, as well as business directed financial products of the same type including mortgages for investment properties and loans and lines of credit provided for use as operating capital, offered by a plurality of offerors, information is obtained in the application processes.

The present invention is a data processing system having one or more program executing computers, and one or more data storage devices, which processes data captured in the application processes and in subsequent transactions. In particular, the invention incorporates one or more computer program products executing on the data processing system 101, which incorporate the following steps:

receiving or extracting or generating data elements regarding financial products contracts, creating a data report in a standard data format containing the financial products contracts data elements, storing the data report in the one or more data storage devices, receiving new data items regarding one or more of the financial products contracts, adding to or modifying the data report to create an updated data report incorporating the new data items, and storing the updated data report in the one or more data storage devices.

The financial products contracts will typically comprise insurance contracts, reinsurance contracts, loans, or lines of credit, or subsequent aggregations and derivative transactions relating thereto, including reinsurance, and derivative securities such as collateralized debt obligations and credit default swaps.

The data elements regarding financial products contracts can include one or more of insurance underwriting standards, insurance financial terms, insurance applicant data, loan application standards, loan financial terms, loan applicant data, or comparable transaction details.

Thus, for example, in the case of a mortgage, the data elements can include one or more of loan underwriting standards of the loan originator; loan terms such as the size or amount of mortgage, the type of loan (primary mortgage or home equity), the loan to value (LTV) and/or combined loan to value (CLTV) ratios, the mortgage rate (Fixed or Adjustable rate (including reset date)), appraisal value, appraiser name, the primary/secondary residence; the Origination Date, the holder of original note/location of assignment documents, prepayment history; and title search; and loan applicant data such as age, income, employment history/type, credit history, debt to income (DTI), and documentation provided, as well as how these elements may be changing over time to impact value/price.

The data report created from these data elements is in a standard format so that the data contained in the report is consistently searchable, combinable, and updatable. Thus, the data in the data report can be used to instantiate an OLAP cube for analysis of the data contained in the reports. The data elements can be stored in a relational database or other database. Alternatively, in a preferred embodiment, the data elements do not require a relational database and are stored with associated data tags to identify each data element. In the most preferred embodiment, the data tags are XML tags. In one version of the preferred embodiment, the standard data format is an XBRL (eXtensible Business Reporting Language) data format.

New data items regarding one or more of the financial products contracts might include one or more of payment history, appraised value, loan to value ratio, comparable transaction details, comparable property defaults or value changes or risks, related financial instrument changes, or derivative contract data, inclusive of each price and associated hedge at each intermediation. The new data items regarding one or more of the financial products contracts can relate to one or more of the following types of risks: asset valuation, bankruptcy, credit, currency, changes in sentiment, counterparty, country, definitional (absence of standardization), diversification, economic (Inflation, recession and interest rates—yield curve), environmental, liquidity, litigation, market crash, moral hazard, performance or operating risk, spread, terrorism or war, transaction, transfer, transparency, volatility, or volumes.

In one embodiment, the financial products contracts comprise credit derivative swap contracts; and the new data items may disclose changes in related financial products, or defaults in related financial products.

The one or more computer programs perform calculations with respect to the new data items to determine risk conditions; and add to or modify the data report to create a risk updated data report incorporating determined risk conditions, which are preferably identified in the apparatus with risk condition data tags. Preferably, the risk conditions are determined relative to predetermined standards. Among these conditions could be one in which the counterpart attests to the accuracy of the disclosure for each risk element giving either the source or measure and the reason for reliance or change from a previous measure.

The apparatus further includes one or more computer programs executing on the data processing system 101 for determining if a person has provided data elements regarding financial products contracts to the data processing system and calculating a system credit related to a quantity of data elements provided by the person. If so, the system credit may be applied by the person to a cost of obtaining data reports from the data processing system or to other economic benefits from reduced subsequent transaction costs.

Preferably, the system credit is operably connected to a data element, data report, new data item, or updated data report. The operable connection may be obtained through a XLink defined hyperlink. The hyperlink will typically be an out-of-band hyperlink known as an extended link. The linkage allows identification of a data contributor and a determination of the possibility of adjustment of schedules of the award of the system credit amounts based on experience gained in the effect of the system credit in enhancing or occluding greater system transparency.

Usages of said system credits are determined and used as an analytic tool to determine an optimum or at least comparable pricing methodology for other financial products contracts. The frequency, amount, and distribution of system credits can be used as an analytic tool to determine a degree of market transparency. A transparency index can be calculated. Derivative financial instruments are to be created and exchanged based on said transparency index. Derivative financial instruments may also be created based on system credits. Such derivative financial instrument can include a credit wallet for the aggregation and exchange of system credits, in which such exchanges might be fungible between different markets and/or sectors.

The data reports are continuously updated to reflect changes arising from external events or from the subsequent transactions. The data reports can be made available to parties in either a primary or secondary market for the financial products. In one preferred embodiment, one or more computer programs executing on the data processing system determine if a person has provided data elements regarding financial products contracts to the data processing system and calculate a system credit related to a quantity of data elements provided by the person. The system credit may be applied by the person to a cost of obtaining data reports from the data processing system.

The data processing systems 101 may incorporate one or more mechanisms that prime an efficient market and that reinforce the efficiency of the market. Three illustrative mechanisms are:

First, where the data processing system 101 constitutes an offering/closing system or exchange for the sale of financial products, the pro rata fees incurred with respect to transactions associated with a patron for patronizing the system might decrease as the total fees incurred by transactions associated with that patron increase. For example, although the owner/operator of data processing system 101 might receive a fee from a lender/insurer when the lender/insurer closes a loan or writes an insurance policy through the system, a portion of the fee might be remitted back to the lender/insurer for having closed a large volume of business through the system in a given interval. Such a system also rewards the individual counterpart for a disclosure, or updated disclosure, with either such and economic or strategic benefit. Advantageously, the fees from all types of loans, lines of credit and/or insurance policies are aggregated for determining the amount of the remittance.

Therefore, this mechanism encourages lenders/insurers to patronize the system with larger, rather than smaller, volumes, which is accomplished by endeavoring to offer the most varieties of loans, lines of credit, or insurance at the lowest interest rates or insurance premiums and at the best possible terms. This might also be true for individual loan or insurance seekers.

Second, some or all of the parties who patronize the system might receive statistics compiled by the system on the condition of the market in loans, lines of credit, and/or insurance products. Although these statistics cost the owner/operator of data processing system 101 little to compile, their value is so great that lenders, insurers, reinsurers, reinsureds and buyers (i.e. borrowers} and/or sellers (i.e. providers) of loans who do not have access to the statistics will have difficulty, in the long run, in competing with those who do. An analogy makes the situation clear; a trader of stocks without access to the stock ticker and current bid and offer quotations can be arbitraged by a trader who does.

Furthermore, although some or all of the statistics might be sold for cash, the statistics are advantageously given for free, or sold at a subsidized price, to those patrons of the system who actually disclose necessary data in the system. Advantageously, the price for the statistics decreases as the measure of fees incurred by transactions associated with a patron increases. For the purposes of this specification, the provision of statistics for free, or at a subsidized price, to those patrons of the system who close loans, buy and/or sell loans, write insurance policies, and/or reinsure risks or both through the system is called "netbacking."

Netbacking also encourages lenders/insurers to patronize the system with larger, rather than smaller, volumes, which is accomplished by endeavoring to offer the most varieties of loans, lines of credit, or insurance at the lowest interest rates or insurance premiums and at the best possible terms.

Third, a portion of the fees incurred with respect to transactions associated with a lender for lending through data processing system 101, or with an insurer for writing policies to insurance applicants, might be credited against the fees incurred with respect to transactions associated with the lender for buying and/or selling loans through the system, or with respect to reinsurance transactions (as either buyer, seller, reinsurer and/or reinsured). For example, many lenders desire to sell a loan immediately after they have made it, and many insurers who write policies immediately seek reinsurance (i.e., to transfer all, or a portion of, the risk associated with the policy to a reinsurer). It is, therefore, possible that a lender/insurer will lend to an applicant or write a policy through the system, and incur a fee for doing so, and then sell that loan or reinsure that policy through the system and incur a second fee. Data processing system 101 credits, according to some credit schedule, a portion of the fees associated with a patron for lending or writing insurance through the system against the fees incurred for buying or selling a loan or for reinsuring through the system.

An alternative embodiment, in the loan context, works in reverse and credits, according to some schedule, a portion of the fees incurred with respect to transactions associated with a patron who buys and/or sells loans through the system against the fees incurred for lending through the system. In the insurance context, this alternative embodiment works in reverse and credits, according to some schedule, a portion of the fees earned with respect to a patron in reinsuring through the system against the fees incurred by the patron in a transaction for writing insurance through the system. In yet another embodiment, in the loan context, the fees incurred in buying and/or selling loans through the system are credited against the fees for lending through the system, and the fees incurred for lending through the system are credited against the fees for buying and/or selling loans through the system. In yet another embodiment, in the insurance context, the fees incurred in reinsuring through the system are credited against the fees for writing insurance through the system, and the fees incurred writing insurance through the system are credited against the fees for reinsuring through the system.

These structures encourage lenders/insurers to patronize the system with larger, rather than smaller, volumes, and to offer the most varieties of loans, lines of credit, or insurance at the lowest interest rates or insurance premiums and at the best possible terms, and by patronizing the secondary market in loans or reinsurance with the best possible bids and offers.

The end result is that in order to compete in the consumer finance, commercial finance and/or insurance markets, lenders, buyers and/or sellers of loans, insurers, reinsurers and/or reinsureds must have access to the statistics, which encourages them to patronize the system with competitive offerings to get access to the statistics, which increases the competitiveness of the market, increases its volume, and promotes its efficiency. Therefore, some embodiments prime the market for efficiency and incorporate a positive feedback mechanism that maintains that efficiency. It is understood, however, that the priming of embodiments might be assisted by advertising and other marketing techniques.

The data processing system 101 may provide a market for: (1) the provision of loans, lines of credit and/or insurance from a plurality of lenders/insurers to a plurality of applicants, and (2) the buying and selling of loans between buyers and sellers of loans, or reinsurance of existing policies by a plurality of reinsurers to a plurality of reinsureds (not shown); and in any event, receives and stores data elements and updated data elements and new data items about such transactions. One or more loan application processors or insurance agents and one or more loan processors or underwriters might advantageously be engaged to facilitate the provision of loans, lines of credit, or insurance between lenders/insurers and applicants.

An "application processor" is an intermediary that prepares a loan or insurance application (e.g., by filling out the paperwork, by entering the applicant's pertinent information into data processing system 101 via a computer terminal, etc.). Although a sophisticated applicant can act as his or her own application processor, it might be desirable for a less sophisticated applicant to have another entity act as an application processor.

An "application" (also known for insurance as a submission) may, depending on context, include an inquiry regarding a loan or line of credit and/or insurance, without a full application being prepared and considered for funding.

A "loan processor" is an entity that evaluates the compliance of a loan and/or insurance application against lending and/or insurance underwriting standards. Although lenders/insurers often act as their own loan processors, a lender/insurer might employ another entity to act as a loan processor.

Furthermore, because many entities in the loan, credit and insurance industries are large and sophisticated, it is common for a single entity to perform different roles at different times or with respect to different transactions. Therefore, a single entity can be:

(i) a lender, or (ii) a buyer (or borrower) or seller (or lender) of loans, or (iii) an application processor (or broker/agent), or intermediator (iv) a loan processor (or broker/agent), or intermediator (v) an insurer, or (vi) or reinsurer, or (vii) a reinsured, or (viii) an underwriter, or (ix) an applicant; or (x) an insurance agent, or (xi) any combination of i-x.

Data processing system 101 receives data from each lender, applicant, application processor (borker/agent or intermediator), loan processor (broker/agent or intermediator), buyer and/or seller of loans, broker/agent or intermediator, insurer, reinsurer, reinsured, insurance agent and/or underwriter/aggregator or distribution agent, and in some embodiments, endeavors to match lenders/insurers with appropriate applicants and reinsurers with appropriate reinsureds, to facilitate the provision of loans and lines of credit. Each lender, applicant, application processor broker/agent or intermediator, loan processor broker/agent or intermediator, buyer and/or seller of loans broker/agent or intermediator, insurer broker/agent or intermediator, reinsurer broker/agent or intermediator, reinsured, insurance agent and/or underwriter is advantageously capable of providing data to and receiving data from data processing system 101 via a data network (e.g., the Internet, etc.) or via a telephone network (e.g., the Public Switched Telephone Network, etc.) or both.

Figure 2:
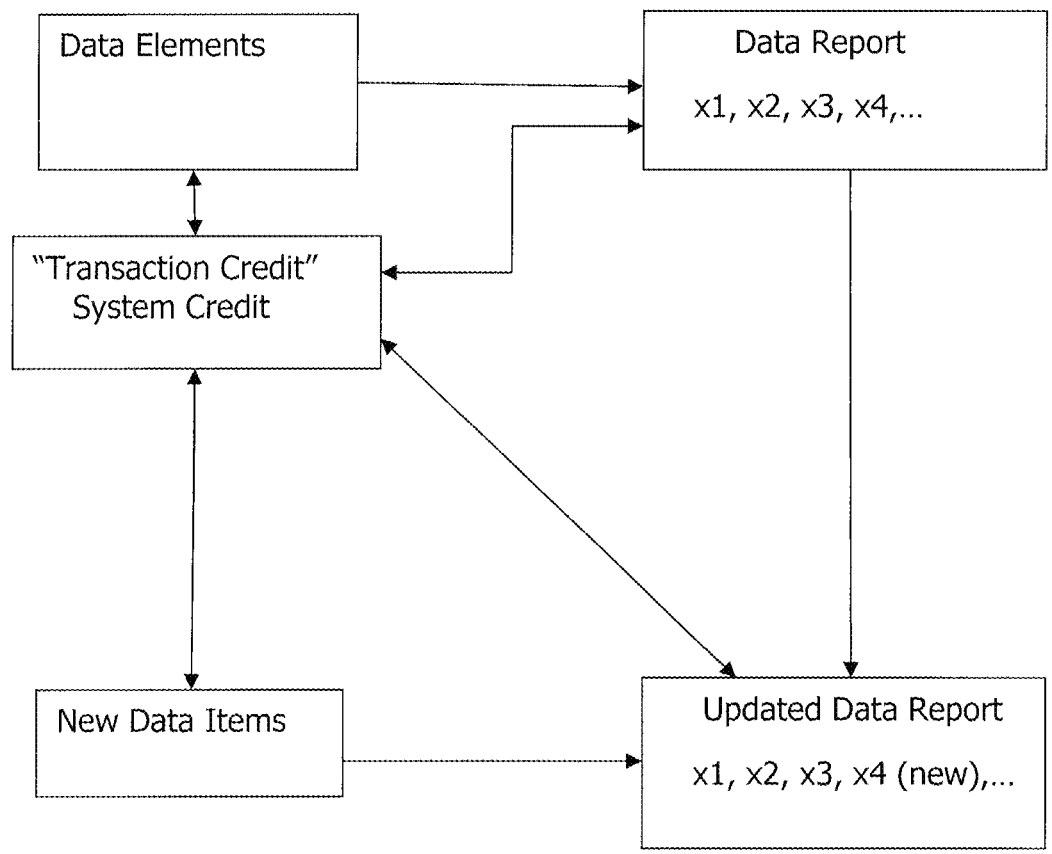
FIG. 2 is a block diagram of the data processing system in accordance with the invention.

FIG. 2 depicts an illustrative embodiment of data processing system 101, which illustrates the updating of data reports with new data items and the earning of a system credit from submission of new data items.

The invention includes the following advantages:

data processing system 101 can provide buyers and sellers of loans with statistics regarding the market in pools of loans, which can be used by the buyers and/or sellers of loans to: (1) assess the price/value of an individual loan, (2) assess the value of a loan or pool of loans, (3) determine which types of loans they desire to buy and sell, and (4); arbitrage those buyers and/or sellers, reinsurers, and/or reinsureds who do not have access to the statistics.

data processing system 101 may provide reinsurers, and/or reinsureds with statistics regarding the market in insurance and reinsurance that are of value in: (1) assessing the cost/value/price of individual policies that are to be reinsured; (2) determining which policies they desire to reinsure and at what price, and (3) arbitraging those reinsurers and/or reinsureds who do not have access to the statistics.

data processing system 101 may provide buyers and/or sellers with an efficient market for the purchase and sale of the servicing of pools of loans (e.g., providing payment collection and other administrative overhead, etc.).

data processing system broadly provides an efficiently priced market by allowing for transaction fees to wholly or partially offset one another or have either offset access to strategically critical market information—even prospectively across asset classes and product lines.

These inducements are possible because the costs of doing business for lenders, insurers, reinsurers, reinsureds and buyers and/or sellers of loans and the interest rates or insurance premiums and fees to applicants are unnecessarily high because efficient markets for loans, lines of credit, insurance and reinsurance do not exist. Furthermore, if a highly efficient market for loans, lines of credit, insurance and reinsurance did exist, the cost of doing business for lenders, insurers, reinsurers, reinsureds and buyers and/or sellers of loans could decrease, the interest rates or insurance premiums and fees to applicants could decrease, and the provider of the market could also make a profit. Furthermore, the existence of an efficient market could even provide lenders/insurers with a larger profit than they make now if operating costs drop more quickly than interest rates or insurance premiums drop. In other words, the intermediation of an efficient market between applicants, lenders, insurers, reinsurers, reinsureds and buyers and/or sellers of loans can actually make the cost of loans, lines of credit, or insurance to applicants go down, the cost of doing business to lenders, insurers, reinsurers, reinsureds and buyers and/or sellers of loans go down and the profits to lenders, insurers, reinsurers, reinsureds and buyers and/or sellers of loans go up. Therefore, data processing system 101 endeavors to provide a market for the provision of loans, lines of credit, insurance and reinsurance that is highly efficient.

The efficiency of the market for loans, lines of credit and/or insurance (the primary or retail market) may be affected by the efficiency of the market in pools of loans and/or reinsurance (the secondary or wholesale market) and vice versa. Therefore, data processing system 101 may improve the efficiency of both the primary market and the secondary market so that, to the extent the efficiency in one enhances the efficiency in the other, a synergy of efficiency between the two markets is affected. For example, to effect this synergy, fees incurred by a patron to the owner/operator of data processing system 101 for lending through the primary market might be credited against the fees incurred by the patron to the owner/operator of data processing system 101 for buying and/or selling through the secondary market (and vice versa).

Risk Transfer

The present invention extends the above described apparatus and methods and extends them to encompass systems for risk discovery and analysis, with associated pricing adjustments, and an exchange or index product for use on an exchange that trades risk transfer and/or financial products that transfer risk, whether in primary or secondary markets. Credits are earned from use of the system, index or exchange. There can be an index of credits. An index may be used to either offset or reflect the measure of transparency. All transactions may be tracked. All credits are tracked—and can be made fungible to cross financial sector or product lines.

Historically, auction markets have provided the most efficient, and preferred means of price discovery for an insurance or financial product. In insurance, reinsurance and capital markets, there are brokers and agents that act as intermediaries between buyers and sellers. Brokers charge "transaction fees" for the transactions that they intermediate. Intermediaries can purchase insurance or financial products in an auction market for sale or brokerage to principals. It is also possible for a principal to acquire the product directly without using an intermediary.

When an intermediary functions in an auction market, their fees are generally smaller because the intermediary is functioning as agent and the commission is stated. However, when an intermediary functions in a negotiated deal—not an auction market, the costs often grow as the intermediary seeks to expand his gross margin. Intermediation costs run between 7-20% (700-2000 basis points) or greater in the property and casualty markets, and a maximum of 5% (500 basis points) for "riskless" NASD-mandated capital market transactions.

pow The cost of intermediation (but not a completed transaction) in the methodology of the present invention is an "all-in" 0.5% (50 basis points). The new inventive methodology or solution enhances price discovery by providing data and analytics on the transactions, contracts, and market activity. This data is provided in real time and on an interactive basis to support accurate risk pricing. Lower execution costs and improved price discovery in the market in time leads to cost savings for all market participants, including the consumer.

For a market to function optimally there must be confidence in the meaning and value of its contractual obligations. Confidence in the contracts increases liquidity in the markets for insurance and other financial products, including all kinds of loans, especially mortgages. Establishment and disclosure of standards, statistics, and definitions applicable to the contracts is fundamental to creating that confidence. This is achieved through disclosure of the terms and conditions of the contracts as well as the clear establishment of necessary underwriting criteria. The use of the invention enables the establishment of standards, definitions, and statistics necessary to optimal functioning of the market, and to creating reliable contracts. The inventive solution does not impose the terms and conditions of the contracts, but rather encourages them to be established naturally in the free market—exposed and fully transparent.

The invention proposes a free market solution to dysfunctional, illiquid markets. The inventive solution focuses on the exchange of underwriting standards in insurance, loans and lines of credit, as well as the creation of data and analytics relating to the individual data element statistics and markets for those products.

An important part of the inventive solution is sorting and matching to the best deal. Through this process, prospective counterparts to a transaction offer increasingly detailed information about themselves in order to better target and price the transaction. This process also helps to control and lower costs by assuring a truly competitive environment for all forms of risk transfer.

The inventive methodology fosters market transparency and induces usage through the grant of an economic or strategic benefit to all market participants. The key element in the process that achieves these points is an economic or strategic benefit, specifically, a system credit arising from system usage which is identified by the trademark name "Transaction Credit." The Transaction Credit system credit attaches to each transaction fee. The Transaction Credit system credit offsets either the cost of future transaction fees, or the cost of access to market-critical information. The Transaction Credit system credit encourages more transactions by lowering costs, generating more market data, and demonstrably improving market liquidity, thereby calming markets. It provides an economic inducement for greater participation as well as a self-priming mechanism for the market—a stimulus that is not inflationary.

Each and every constituent part of the financial market food chain—whether a consumer, intermediary, transaction platform, workflow or process enabler, or an investor—is invited, but never compelled, to participate in every stage of the transaction.

All markets "clear" risk (meaning that they price risks and transform them into acceptable and manageable structures) at what is called the clearing house price. The clearing house price is a function of many things, most importantly, comparable transactions. As a result, the more the risk can be defined and standardized, the more easily the market clears, defines and standardizes it.

It is estimated that there are as much as $200 trillion in annual catastrophic environmental risks in the U.S. Distributing these catastrophic environmental risks efficiently allows for future stability in the marketplace as the fee income from these risk transfers can offset current losses. Even at the fully-loaded estimated 0.5% cost of the inventive methodology can save the nation trillions of dollars.

Moreover, the methodology can be expanded to other large-scale risks (allocation of natural resources, food, medicine, population, even threats to civil peace), or the focus can be narrowed to further granularly define on a going forward basis all existing financial instruments.

The solution of applying the invention to risk transfer is applicable to any financial instrument and market participant for which there is a primary and secondary market, and intermediation. This includes loans, lines of credit, insurance and reinsurance, derivative and other financial products. In a model, additional revenues flow from incremental transaction fees or the purchase of information.

The solution involves a universal Transaction Credit system credit that conveys an economic benefit, displayed electronically, that fosters the development of an "Infomediary" that carries the necessary data and analytics to clarify the marketplace. This credit will be used to support an effective utility, thus offering a more efficient and volume-enhancing electronic distribution network for a full range of financial products, including financial products that impact all forms of risk transfer. The result gives clear, economic and strategic advantage to the system user and induces usage generating business volumes.

Sitting at an electronic meeting place of product creation, transaction and pricing is a measure of fees, associated credits and remaining terms of use that buy economic and strategic advantage for users through lower costs or provision of critical market information.

Such information is, without limit, a description of: individual risk(s) covered; specific financial exposure per product; amount of government or private sector coverage of potential loss; diversification or incidence or percentage risk per investment pool (which can include a single risk category or multiple risk categories such as environmental, weather, interest rate, counterparty and other analyzable risks); original and subsequent market pricing; and market volumes—an effective "ticker" of all appropriate financial market information available in real time.

Over time, an analysis of the operational metrics involved in all aspects of product creation can be re-deployed to enhance operational efficiency, facilitate document exchange, vetting and certification, reveal market excesses, create new products, modify the terms and conditions of existing products or predict, mitigate and, in some cases, even avoid risk.

This technology can be superimposed on an existing, de facto marketplace, singly or in a serial fashion to create a virtual community of interests, a truly collaborative effort that accesses all necessary capital pools. It can be easily organized using today's technology and financial skills at low cost relative to any other solution, open to all, enhancing and linking—but not disturbing—all sectors and transaction platforms in the marketplace. It is an approach that is entirely optional and voluntary, in which all participants trade transparency-related information for lower costs.

Key to the process is the electronic real-time display of the clear economic benefit available from the Transaction Credit system credits for each and every market participant, their financial impact, their convertability and fungibility into other goods and services and their remaining term of use.

One should look for low-cost ways of improving transparency in all credit, insurance and risk-related markets. There is a need to try to grow the market out of its current inefficiency.

Attributes of the system include:

(1) It is neutral—it does not favor any one special interest group or constituency.

(2) It is internet-focused (thereby creating widest market reach).

(3) It focuses on underwriting standards and statistics.

(4) It provides its own economic and strategic benefits.

(5) It is transparency-inducing, without being transparency-requiring (each counterpart does precisely what they choose, in terms of disclosing their unique circumstance and being matched to or paying an appropriate price).

(6) It delivers increasingly granular real-time data and analytics for all financial products with primary and secondary markets.

(7) It is the lowest-cost method relative to all other solutions.

(8) It is entirely volitional.

(9) It carries the benefit of both organic and viral growth (caused by the fact that trade participants always lower costs, gain revenues and market share; whereas non-participants lose).

(10) The public demonstrably wins through better pricing of goods and services.

(11) It is easily adaptable to all current transaction platforms and technology.

(12) It can be initiated almost overnight, simply by executive mandate.

(13) It provides a stimulus (made clearest through an electronic display) without any inflationary risk.

(14) It facilitates easy entry and exit of new product/services.

(15) It does not require additional expansion of government functions or bureaucracy.

(16) It is a private market solution; an American innovation.

(17) It tracks all market transactions, and forms a low-to-no-cost audit trail.

(18) It could look like a Government Sponsored Enterprise that sponsors transparency, not needing to make financial guarantees, simply validating that the information is disclosed anonymously.

(19) It can identify, predict, mitigate and, possibly, avoid risk.

(20) It is capable of presenting as a dedicated search engine for Financial Services.

(21) It is friendly to and compatible with all financial market sectors and risk transfers.

(22) It encourages massive market growth of all types of risk transfer instruments and securities.

The financial marketplace consists of numerous products that have evolved out of the most basic designations of equity and debt. Product specialization has resulted in linguistic and semantic differences, similar to those that can be found in different national languages in the world's countries. The transactional conventions and methodologies for scoring and rating the products that are associated with these differences can result in real price and term discontinuities, just as they appear in society as different approaches with different meanings. As is well known to those in the trade, it is possible through one kind of financial engineering or another to change high risk assets into low risk ones through various kinds of aggregation, diversification, hedging and division of risk. As a result, a single C risk can be re-configured into a product that appears to have AAA-risk characteristics. Of course, the individual asset retains the same characteristic that it always had; it is the pooled, re-configured and financially re-engineered aggregation of products that is measured differently. The difference is most easily seen as the analysis becomes increasingly granular. The disease that might infect one class or sub-class of assets may not necessarily spread to the whole—and then again it might. The financial world has now seen how this result can play out to disrupt the entire marketplace in the subprime mortgage crisis of 2007-2008. This is a clear example of a financial "perfect storm".

Separately, the invention focuses on giving individual financial product characteristics a more ordered methodology for analysis. In loans and lines of credit, insurance and reinsurance, and in related derivative products, our work has looked at the creation of basic origination of individual financial products and secondary market approaches to compare the characteristics of the individual risk into an associated product and to track the performance on both a past and a going forward basis in the resulting product placements. The invention contemplates the establishment of an electronic Transaction Credit system credit system to generate liquidity; collecting underwriting standards and statistical measures and connecting them to fees across all participating sectors in insurance and reinsurance; operating and strategic relationships in insurance between risk intermediation (brokerage), product origination and risk underwriting (insurer) and investor participation in narrowly defined risk aspects (reinsurance); and, operating metrics in both the most complex and evolved instruments (mortgages) as well as other types of loans, as creating a methodology for observing how inquiry can be handled and distributed in order to direct each product inquiry to a proper risk carrier.

This work facilitates product movement for the placement of various kinds of risk into different types of financial products.

Additionally, focus is on the development of measures for predicting, mitigating and avoiding risks—and other products. Risks exist almost without limit in finance and financial market participants each look at—and price—risk in a unique way. Risk avoiders, risk intermediaries and risk investors can be seen to be constantly engaged in a struggle either to reduce or to add the perception of risk in order to charge for their ability to place it with a third party. The more the conventions that measure risk can be accepted and differentiated, the lower the costs of all of the various forms of risk transfer.

Looking at the individual operating metrics of each risk intermediator allows one to see when specific risks enter the financial food chain. Since humans perceive reality retrospectively, recently experienced and understood risks tend to appear larger than those in the more distant past. In other words, identifying individual risks so that they can be placed in the past facilitates both their pricing and their identification.

This kind of thinking is associated with Gaussian mathematic concepts which look at history in terms of a statistical past. Risk occurs, in terms of this type of mathematics, in some kind of linear or "normalized" fashion that can be grouped in such classifications as standard deviations. What needs to be understood is that, in fact, risk occurs elliptically, in an irregular or non-symmetric fashion. Current measures of risk look at either frequency or severity of risk; they do not account for both the frequency of the severity and/or the severity of the frequency. It can be predicted statistically when a hurricane will hit the US. It can be predicted statistically when a hurricane will hit a city. Presently, it is not possible to predict when, like Katrina in New Orleans, a hurricane will hit a particular low-lying city and overwhelm the levies, resulting in incomprehensible damage. That is because such a catastrophe has not even been imagined. Since humans past reference their experience, calling it wisdom, they presently use history to project the future. This cannot be done, because the future, by its nature, has not necessarily been observed in the past. Experts have judged that it will take 50 years of supercomputing to process such risk. The need to evaluate the risks properly is immediate. This invention provides a solution.

Reference is made to a torus when considering risk analysis. This is a geometric surface and interior shaped like a donut. It is described as "a surface generated by rotating a circle about an axis that is in the same plane as the circle but does not intersect it." A torus resembles a donut and is a subtype of a toroid. On occasion, if one were graphing risk in three dimensions, it would appear as a kind of oddly-shaped toroid, bulging with each unique circumstance. Risk occurs this way. In other words, the ordinary locus of points that describe the surface of this kind of object is pulled apart by a unique circumstance, in effect a particularized experienced risk that can be measured. Different types of toruses should be studied as identifying different types of risk and risk incidence.

Reference is made to LaGrangian Mathematics when considering risk analysis as it describes movement tied to a constant structure (as each financial product by definition can be seen as tied to a constant structure)—something like a pendulum with movable support.

If one could connect all the elements of all the financial product origination, transacting and processing platforms in real time and present the results graphically and compare them to the observed results, one could measure when a risk "bulged", expanded or stretched, or unduly constrained, stopped or established an illiquid circumstance (or similar price discontinuity), as measured by the shape of the donut.

This can be seen to apply to the Transaction Credit system credits that have been referenced which have the capability of linking all types of platforms. A ubiquitous credit (one that is in widespread use) can be seen as a common tool for measuring market risk, by business etc. Credits in themselves can be used to create a single indicia with real or perceived predictive value. To help visualize, as ball bearings are to data so credits equal a magnet; and as ball bearings are to credits so data is to a magnet—with each magnetic flow pulling the other through the system. Data flows toward those with credits and credits flow toward those with data.

The invention contemplates a new kind of risk measurement—possibly predictive, mitigative or avoiding.

Transaction credits link not just similar, but also dissimilar products, across all origination, transacting and processing financial and non-financial platforms, inclusive of all types of goods and services. In other words, linkages are created between, not just one product having a primary and secondary market. Linkages are created between all financial products having primary and secondary markets. This allows credits which are or can become more ubiquitous and universally fungible. The credits may flow along more paths including cross-product paths, enabling risk and financial product performance measurements that look beyond a single class of financial product and associated risks.

Credits are used to track business and non-business volumes and to observe the various risk elements that comprise them. This has the effect of using a credit to standardize different measures.

Comparable operating metrics, (which may be visualized as forming a graphic type of CAT scan) all types of origination, transacting and processing platforms—for financial and non-financial (commercial) products—are compared in real time when a risk is perceived, in order to see if the risk, and specific performance of a financial or non-financial product, can be related to the operations of any platform. This allows one to look inside the entire supply chain of financial products to see if a perceived risk can be linked to any particular type of platform, industry, or type. The risk is perceived as a "bulging"—like an aneurism in a vein—in the toroid-type graphic analogy. It occurs, sometimes for limited durations, as a risk experience that can be adjusted to provided a Bayesian mathematic measure (one that is adjusted for the probability of the next occurrence.

Comparable market metrics (inclusive of gross movement by price or size are accomplished. Actual performance of given financial or non-financial products or instruments, by any measure, is identified in linguistic or semantic terms and a search for like elements in differing products then occurs.

The invention considers all intersections of data, inclusive of both operating and market metrics as potentially risk predictive. The invention contemplates a new kind of hedge for the coming market transparency and greater impact of risk prediction. The invention includes the following concepts:

1. an index comprised of financial Transaction Credit system credits;
2. an index comprised of non-financial Transaction Credit system credits;
3. an index comprising both financial and non-financial transaction and non Transaction Credit system credits;
4. an index focused on operating metrics, as described above; and/or
5. various indices combining operating metrics and transacting credits.

The invention includes a new kind of targeted "search" tool for computers in which the search can be directed by the applicability for use of the Transaction credit.

Transaction credits are used as a tracking measure for finance and commerce and ordered by usage, number, size, type, etc. Market data, inclusive of Transaction Credit system credits and volumes, is embedded in software that connects to a central database that is the search engine. Searches are ordered by statistical relationships between discrete market transactions, as measured by a Transaction Credit system credit/index. Searches are ordered by ranking credits according to the size of the discounts they will buy on specific transaction fees/costs. Searches are ordered by the net cost, by product type, inclusive of the discount given to a specific recipient.

The invention contemplates an environment in which the above tool exists. The invention further contemplates creating a new kind of "credit wallet" or "21st century money" that generates liquidity and asset valuations. This creates a new form of financial market currency that embodies a type of barter that results in a preferred pricing or acceptable cash flow. Every person has a stock of credits for all their assets: cash, real property, personal property, automobile, life insurance, other insurance, stocks, bonds, other financial products, etc. which may be traded and for which there is an index for trading or exchange with transparency and data and information is given.

There is maintained a schedule or listing of all assets, financial, non-financial, commercial and collectable, as well as their remaining terms.

There is an effective real time pricing of the above, in which present or past bids/offers are compared by software "spiders" searching all kinds of transaction platforms, auctions, sales etc.

In the inventive system, the search (including one that is semantic or linguistic) is targeted by past credits. In the inventive system, the search may also be ordered by time necessary to clear and liquefy the asset. There is a consolidated display of associated pricing and current valuations that form a new kind of liquidity measure.

The invention contemplates a display of risk-related information from varied sources (data flows, marketplaces, analytic resources) and paying for these service feeds through ubiquitous credits that accompany and can relate to transaction fees for financial products.

All of the above system concepts may include varying the value of the credit by the amount of the stated cost of a service to be absorbed. Additionally, the value of the credits may be varied by:

a. the conversion rate of the credit into a good, service or transaction fee;

b. the remaining term of the credit;

c. the present value of the combination of a and b (above);

d. the addition of one other factor having economic impact and known to those familiar in the art; and/or e. the weighting of the estimated incidence of risk.

The invention contemplates the above described methods and systems wherein the offset of credits from transaction fees references differences between varying types of financial products; wherein the offset of credits from transaction fees references varying types of both financial and non-financial products; and/or wherein the offset of fees in any one market sector is offset against the cost of access to information describing the transactions or the marketplace in general.

As mentioned above, the invention introduces a "credit wallet", tracking in real time the individual, aggregate and remaining value and time of unused credits—or discounts—of commercial value to offset the cost of transactions:

designing a transaction system or electronic marketplace, specifically to assign credit prices/designations from bonafide bids/offers, to enhance both liquidity and fungibility between different credit structures;

a specific methodology for summing such credits to arrive at a new effective net price;

by ranking size of acceptable or exchangeable credit;

the ordering of such pricings to inform or rank "search" functions on a computer according to their effective net price; and/or use in combination with a cell phone of similar personal communications medium that identifies the specific user, assuring and establishing real-time credit-worthiness, facilitating business dealings.

The invention devises a central market mechanism for credits and/or discounts:

inclusive and exclusive of one in which access to various services is offered in exchange for consumer willingness to lower privacy requirements (i.e. trading privacy restrictions for favorable pricing or some kind).

The invention further contemplates operating as a valve separating market sectors and their associated information flows.

A. A valve between market sectors opens and closes in such a way (as if pulsing) that it induces increased transactions, data or analytic draw downs or both;

B. It creates a measurement of the history of flows (stasis is not good) between the two sectors as a guide for providing price or term inducements.

C. It offers progressively more "granular" information and provides increasingly refined product views.

D. The emphasis of the analytics will shift from improving operational and volume performance to focus on strategic benefits, product positioning, transaction patterns, and risk analysis.

E. Real time data and analytics are grown organically out of customer inquiry and will be sufficiently robust to compel usage by all industry participants.

F. A database displays and cross references all elements relevant to policy issuance, including, without limitation: volumes, by broad product type or sub group, by region, by time, price, terms, type of counterpart, etc.; operating metrics; audit trails; and, in time, both granular and high level risk performance by loan or insurance product or borrower or insured type analyzed as far down as performance on the individual loan or policy level.

In summary, there is a valve between market sectors which opens and closes in such a way (pulsing) that it induces increased transactions, data or analytic draw downs or both; creates and enables a measurement of the history of flows (stasis is not good) between the sectors as a guide for providing price or term inducements. Real time data and analytics grow organically out of customer inquiry and will be sufficiently robust to compel usage by all industry participants. Electronic database displays and cross references all elements relevant to product and/or policy issuance, including, without limitation: volumes, by broad product type or sub group, by region, by time, price, terms, type of counterpart, etc.; operating metrics; audit trails; and, in time, both granular and high level risk performance by insurance product or insured type analyzed as far down as performance on the individual policy level offering progressively more "granular" information leading to increasingly refined product views. Over time the emphasis of the analytics shifts from improving operational and volume performance to focus on strategic benefits, product positioning, transaction patterns, and risk analysis.

The invention also contemplates measuring risk from inquiry through loan/policy performance to reveal predictive aspects and individual toxic risks.

A. The invention resolves the application/submission process.

B. It measures risk from-inquiry-through-loan/policy performance to reveal predictive aspects (an entirely new measure).

C. It offers progressively more "granular" information provides increasingly refined and risk-descriptive and/or differentiated product views.

D. Emphasis of the analytics will shift from improving operational and volume performance to focus on strategic benefits, product positioning, transaction patterns, and risk analysis.

E. Real time data and analytics are grown organically out of customer inquiry and will be sufficiently robust to compel usage by all industry participants.

F. A database displays and cross references all elements relevant to loan or policy issuance, including, without limitation: volumes, by broad product type or sub group, by region, by time, price, terms, type of counterpart, etc.; operating metrics; audit trails; and, in time, both granular and high level risk performance by loan or insurance product or borrower or insured type analyzed as far down as performance on the individual policy level.

The invention resolves key inefficiencies of the multiple application submission process through the electronic compilation of inquiry and transaction details; real time data and analytics grow organically out of customer inquiry and will be sufficiently robust to compel usage by all industry participants. An electronic database displays and cross references all elements relevant to product, loan and/or policy issuance, including, without limitation: volumes, by broad product type or sub group, by region, by time, price, terms, type of counterpart, etc.; operating metrics; audit trails; and, in time, both granular and high level risk performance by insurance product or insured type analyzed as far down as performance on the individual policy level offering progressively more "granular" information leading to increasingly refined product views. Over time the emphasis of the analytics shifts from improving operational and volume performance to focus on strategic benefits, product positioning, transaction patterns, and risk analysis.

The invention further contemplates:

A. Map and grade key lending/insurance product elements;

B. Map and grade key industry metrics;

C. Offering progressively more "granular" information provides increasingly refined risk-differentiated product views, as well as associated risk differentiated and risk specified cash, futures, option and indexed markets;

D. Emphasis of the analytics will shift from improving operational and volume performance to focus on strategic benefits, product positioning, transaction patterns, and, possibly as early as year 3, risk analysis;

E. Real time data and analytics grown organically out of customer inquiry and will be sufficiently robust to compel usage by all industry participants;

F. Database displays and cross references all elements relevant to loan or policy issuance, including, without limitation: volumes, by broad product type or sub group, by region, by time, price, terms, type of counterpart, etc.; operating metrics; audit trails; and, in time, both granular and high level risk performance by loan or insurance product or borrower or insured type analyzed as far down as performance on the individual loan or policy level.

The invention allows the user to map and grade key lending/insurance product elements and map and grade key industry metrics: Real time data and analytics grow organically out of customer inquiry and will be sufficiently robust to compel usage by all industry participants. Electronic database displays and cross references all elements relevant to product and/or policy issuance, including, without limitation: volumes, by broad product type or sub group, by region, by time, price, terms, type of counterpart, etc.; operating metrics; audit trails; and, in time, both granular and high level risk performance by insurance product or insured type analyzed as far down as performance on the individual policy level offering progressively more "granular" information leading to increasingly refined product views. Over time the emphasis of the analytics shifts from improving operational and volume performance to focus on strategic benefits, product positioning, transaction patterns, and risk analysis.

The invention further includes positioning a search function in cyberspace as an exchange. The search function serves to:

direct all transactional and informational flows to improve market knowledge and business efficiencies;

give the borrower/insured—or their designee—a choice on resolving the loan application/insurance submission process;

take the information resulting from this resolution of multiple application or policy submissions and replay it in the form of anonymous industry real time inquiry or transaction analytics;

require increasing levels of volumes of closed transactions from exchange participants;

price the service so as to provide incentives for transacting in products where there is limited use (give it away at first, then price as the data and analytics become more valuable);

devise a valve between any two market sectors that opens and closes in such a way (pulsing) that it induces increased transactions, data or analytic draw downs or both (The system creates a measurement of the history of flows (stasis is not good) between the two sectors as a guide for providing price or term inducements);

measure risk from inquiry through loan/policy performance to reveal predictive aspects;

return an equal dollar override on all exchange profits to broker and carrier members (thus advantaging smaller members who derive an override on high levels of transactions) but compensate those with larger volume with access to more market information (to their strategic benefit);

map and grade key lending/insurance product elements; and/or map and grade key industry metrics.

Using the concepts disclosed in the patent for a "Data Processing System For Making the Market For Insurance and Reinsurance More Efficient" incorporated by reference herein above as a guide for structure, the invention intends the following:

1. To partner with all strategically appropriate entities, wherever possible, to expedite development of an exchange (ECN), and to build market presence and transaction volume. For example, one of the earliest challenges is resolving issues for brokers and carriers surrounding multiple policy submissions (complete with relevant customer-driven data "sorts"), issuance, and maintenance for insurance policies to be inclusive of claims payment data or similar for loan types and the per contract cash flow performance.

2. To present a familiar, intuitive interface of service to any industry participant.

3. In the first three years, to develop the interface of system software as early on as possible, to facilitate industry use of the ECN, and thus to capture, analyze and display in real time a variety of market elements of critical interest to industry participants. In year three, dependent on system development and sophistication, an intense marketing effort will accompany each new system rollout.

4. Progressively more "granular" information will provide increasingly refined product views. In addition to the 40,000+ brokers and 8000-odd insurers, this information will be of keen interest to: product developers; market and risk analysts; data miners; rating companies; investment bankers; security market traders and analysts; regulators from 55 states and jurisdictions; and, electronic and print distribution companies focused on business information. Over time, the emphasis of the analytics will gradually shift from improving operational and volume performance to include a focus on strategic benefits, product positioning, transaction patterns, and, possibly as early as year 3, risk analysis. The data that is to be collected and displayed will grow organically out of customer inquiry. In time the unique, real time data and analytics will be sufficiently robust as to compel usage by all industry participants.

5. The second five years will build on this base and extend it into new market areas all of which have been previously referenced: a greater focus on data base sales and infomediary functions; building additional strategic interfaces; and, an entry into both international markets and reinsurance. The necessary information flows naturally out of the company's intention to develop or partner on resolving the issue of multiple submissions and issuance of insurance policies. The individual data elements, including anything that can even broadly be considered underwriting data, as well as volumes can be aggregated and analyzed as a function of handling the submission. This database can be contrasted, through its granularity, with the currently available high level carrier developed and regulator aggregated information. Because of an initial broker customer interface, as well as an intended future agency management system relationships, claims-paying analytics as a predictive tool will be used to begin enhancing the exchange entry into both the global and the reinsurance market. A comparable and equivalent model may exist for the lending sector, both primary and secondary markets, down to a per contract level.

The model is designed to develop a database that displays and cross-references all elements relevant to policy issuance, including, without limitation: volumes, by broad product type or sub group, by region, by time, price, terms, type of counterpart, etc.; operating metrics; audit trails; and, in time, both granular and high level risk performance by insurance product or insured type analyzed as far down as performance on the individual policy level. A comparable and equivalent model may exist for the lending sector, both primary and secondary markets, down to a percontract level.

There are several aspects to the confidential strategy and proprietary drivers that need to be explained:

1. Use of an electronic communications structure;
2. All market access fees (other than initial broker or carrier membership fees) are paid by the borrowers or insureds;
3. The size of these fees will be based on "shadow" credits equal to a certain 50 to possible 75 basis points (0.5 to 0.75%) of premium charged;
4. These credits will be used to offset charges of what will be initially very high level but, over time, increasingly detailed statistics available to the trade;
5. Initially the charges for the data will be low, allowing widespread access to the information, at first virtually given away to gain experience;
6. Reactions to, and requests for, data and analytics will be closely monitored to guide future growth;
7. This information flows naturally out of the intention to develop or partner on resolving the issue of multiple submissions and issuance of insurance policies as the individual data elements and volumes can be aggregated and analyzed as a function of handling the submission. This database can be contrasted, through its granularity, with the currently available high level carrier developed and offered and regulator aggregated information or the equivalent lender developed and offered information. Because of an initial broker customer interface—and future agency management system relationships, claims-paying analytics as a predictive tool will be used to begin enhancing the exchange entry into both the global and the reinsurance market. Similarly, in lending, per asset cash flows will be measured in real-time to determine value.
8. Over time, and through normal growth, small brokers (or, alternatively, insurers/reinsurers) gain a significant tool for leveling the playing ground for insurer/reinsurers (or, alternatively, broker) access. However, they have a relatively limited ability to buy increasingly sophisticated and significant data and analytics using their credits—because they don't do sufficient business in term of dollar volumes to generate enough credits. They pay dollars for access;
9. Over time, and through normal growth, large brokers (and, alternatively, insurers/reinsurers) gain a significant tool for leveling the playing ground for competing in the middle market and for smaller accounts and have a wider-than-normal range of insurer/reinsurers (and, alternatively, broker) access. They have an enhanced ability to buy significant data and analytics because the dollar size of their credits is greater than (therefore it buys more information) that of their smaller, competitors;
10. This information flows naturally out of the initial intention of the company to develop or partner on resolving the issue of multiple submissions and issuance of insurance policies. Then, the individual data elements and volumes can be aggregated and analyzed as a function of handling the submission. (This database can be contrasted, through its granularity, with the currently available high level carrier developed and offered and regulator aggregated information. Because of our initial broker customer interface—and future agency management system relationships, claims-paying analytics as a predictive tool will be used to begin enhancing the exchange entry into both the global and the reinsurance market); Similarly, in lending, per asset cash flows will be measured in real-time to determine value.
11. The ever-increasing data flow results in improved granularity of information;
12. A constantly more detailed database permits all participants to see "where they are, where they are not, and where they should be" in terms of industry products, services and operating metrics and to develop derivative markets;
13. Volume is driven through the exchange by either advantageously raising/lowering the cost or increasing/shortening the term of either the exchange access or "infomediary" fees to drive volumes from one sector to the other; and,
14. While the insurance exchange has the capacity from the outset to "go global", a robust database and partnering with agency management systems creates an increasingly unique inquiry-through-policy performance market view that enhances risk analysis and is likely to be of interest to insurers/reinsurers. This helps create a specific road to future entry into the international insurance/reinsurance. Similarly, in lending, per asset cash flows will be measured in real-time to determine value and improve risk analytics.

The interaction of the different parts of the model system and method transforms the market for insurance or lending into a highly efficient one with higher levels of submissions bound or loans closed and reduces "failure-to-close" levels. The model marketplace presents a familiar and intuitive operating platform that requires no internal reorganization from clients while supporting the creation of a common language and market standardization for participants. Any changes in business practices are organic.

The particular linkage of market sectors, plus the concept of providing market-driven access to key data, can be expected to encourage high levels of volume and associated information through the marketplace, resulting in an anonymous, critically important, proprietary database of insurance inquiry and activity across a full policy life cycle from initial inquiry throughout final disposition.

The database enables participants who originate insurance to more granularly match the needs of insureds to appropriate insurers against more precise market pricing and underwriting or risk profiles. This, in turn provides industry participants the unique opportunity to "map", in real-time, all insurance "coordinates" and to correctly position their insurance inquiries and products in the marketplace for maximum effect. The equivalent phenomenon facilitates origination in loan markets and secondary market placement.

The database provides transaction information and economic insights that are more immediate, better, broader and more targeted than any comparable data. This layered database, available only to participants, reveals market information that can give significant strategic advantage to: brokers, insurance and reinsurance carriers (especially for product positioning, risk management, and market analysis). It also creates a real-time audit trail, facilitating and lowering the cost of regulation. The equivalent phenomenon facilitates origination in loan markets and secondary market placement.

The invention contemplates use and creation of "the valve" to control the interaction between transactions and data flows.

The ability to assess risk by looking at the insurance policy life span from the initial inquiry through issuance and claims paying history is new (across multiple insurance companies, brokers, reinsurers and regulators). Heretofore, policy performance was assessed retrospectively and in the aggregate from data provided by individual carriers to the trade. The data was broadly undifferentiated except for issuance date, product, state, etc. With capture and retention of granular inquiry components, analysis of risk can be implied historically—starting with the inquiry. The same occurs for lending even on a per contract or loan level experience.

Differentiating granular policy inquiry, submission or issuance components brings the ability to better target the matching of insured to carrier as well as to determine un-served or underserved market niches. The greater the differentiation, the more easily are the matches as well as the niches exposed.

Displaying what's going on in the marketplace in real-time lets market participants see where they are, where they are not, and where they should be. As a result, market intelligence is disseminated faster and better and market positioning is improved.

The invention facilitates the capture of all data associated with a transaction and aggregates, and recycles the information to help create new products or other market possibilities. It provides better opportunity for targeted growth at lower acquisition costs. It provides improved ability to determine competitive position in marketplace. It provides improved accuracy of submissions and underwriting information. More granularly matches insurer risk transfer needs to reinsurers. The invention increases customer retention. More granularly matches insureds to insurers against more precise market pricing and underwriting. The invention enhances ability to monitor the effects of competition. The invention, further, yields lower marketing and communication costs. It renders low cost and anonymous entry and exit for new products and services.

Using the invention, there will be quicker turnaround time for receiving quotes; more competitive quotes for insureds to consider from the marketplace; more efficient processing of policies, endorsements, and claims; and perhaps most importantly, the insureds will know and be able to see that their insurance package was competitive with the marketplace. Over the long-term, the ECN should drive cost out of the system just from the sheer efficiencies and create more competitive products that should ultimately reduce the cost of insurance products for everyone.

Additional market intelligence reports will be available regarding: individual agent and broker hit ratios (i.e. risks offered vs. those actually written by insurer, by line of business, by type of risk); risk placement declinations by insurer and agent/broker, including declination reasons; performance-to-sales goals, giving year-to-date comparisons of insurer placements vs. goals; and many more.

The invention:

Creates faster turnaround time and increased accuracy for quotes, business processing, insurance and reinsurance submissions;

Enables more efficient and accurate communication between brokers, insurers and reinsurers;

Recognizes risk characteristic differences in the submission of a particular risk by multiple insurance intermediaries and rejects the incorrect/incomplete ones, controlling the integrity of the marketplace;

Corrects lack of control over electronic documentation flow;

Uses market disclosure by anonymous counterparts to improve matching and transparency;

Provides analytics that are presented anonymously except to appropriate regulators;

Provides verifiable audit trail to facilitate regulatory oversight and support for customer inquiry;

Analyzes submission/quoting process for individual participant carriers to determine the competitive and non-competitive risk bidding variables;

Increases issuance and servicing efficiencies;

Maps, in real-time, all insurance co-ordinates and correctly positions insurance inquiries in marketplace;

Preserves the individual underwriting criteria and guidelines of the insurance companies;

Provides ability to benchmark;

Improves oversight of business to broker, broker to insurer, and insurer to reinsurer transactions; and/or Provides metrics that measure operating performance.

Multiple policy submission problems are resolved (without a broker functioning as an intermediary) and the resulting data is displayed to participants with the credits from transactions somewhat offsetting the cost of data and analytic access.

There are several aspects of the invention to mention:

1. All market access fees (other than initial broker or carrier membership fees) are paid by the insureds in the form of an exchange access fee which may differ from a commission on an exchange;

2. The size of these fees will be based on "shadow" credits equal to the dollars of the exchange fees charged and exchangeable into credits;

3. These credits will be used to offset charges of what will be initially very high level but, over time, increasingly detailed statistics (granularity and its greater value for identifying pockets of advantage);

4. Initially the charges for the data will be low, allowing widespread access to the information—which will be so high level that it will be virtually given away. However, as the database becomes more robust the price of database access is increased;

5. Reactions to, and requests for, exchange data and analytics will be closely monitored to guide future growth;

6. Over time, and through normal growth in an exchange setting, small brokers gain a significant tool for leveling the playing ground for increased insurer/reinsurers access. Similarly, insurers/reinsurers gain a significant tool for leveling the playing ground for increased broker access. However, small market participants have a relatively limited ability to buy increasingly sophisticated and significant data and analytics using their credits—because they don't do sufficient business in term of dollar volumes to create enough credits to buy much data. As a result, they pay incremental dollars for access. This is the key method for offsetting the fact that both small and large brokers (carriers) receive the same market share at a controlled price. However, the larger participants gain access to more data and analytics because they do much more business in terms of absolute dollars even when their percentages are equal to those of other market participants;

7. Over time, and through normal growth, large brokers gain a significant tool for leveling the playing ground for competing in the middle market and for smaller accounts and have a wider-than-normal range of insurer/reinsurers access. Similarly, large insurers and resinsurers have an enhanced ability to buy significant data and analytics because the dollar size of their credits is greater than (therefore buys more) that of their smaller participants including smaller brokers. This "netback" of information for dollars is potentially new and integral to our invention. It is not obvious that large brokers would prefer access to more information than a greater profit share but in fact they do and this invention is centered around that fact. This is because the information can lead to increased product creation or differentiation which in turn can lead back to more profit share through enhanced strategic positioning and diminished risk transfer costs.

8. All brokers agree as part of their membership contract to flow a minimum, and growing, percentage (from 2% to 50% over ten years) of their property and casualty business through the exchange;

9. The ever increasing data flow results in improved granularity of information—and granularity creates new market opportunities;

10. An increasingly detailed database permits all participants to see "where they are, where they are not, and where they should be" in terms of industry products, services and operating metrics and to develop derivative markets;

11. Volume is driven through the exchange by either advantageously raising/lowering the cost or increasing/shortening the term of either the exchange access or "infomediary" fees; and 12. While the exchange has had the capacity from the outset to "go global", a robust database and partnering with agency management systems creates an increasingly unique inquiry-through-policy-performance market view that enhances risk analysis and is likely to be of interest to insurers/reinsurers. Resolution of multiple policy submissions, etc. also looks at comparative industry metrics in real time. This helps create a place for a future and international insurance/reinsurance exchange.

The loan and line of credit-focused invention extends the linked marketplace from consumer through transaction platform to a clearance bank and end user investor. It induces involvement in exchanges by making critical market data available to transacting members on a conditional (i.e. time, price, by circumstance, etc.) basis.

The invention is a data processing system that collects the full range of industry data (i.e. the approximately 100,000 types of loan strucures (mortgages are one example), line of credit or individual insurance product down to the policy level) and runs that data through a common sieve.

Drawing down from a plurality of lenders and insurers, it gives a picture of market activity.

Government reporting is necessary. Today the insurance regulators report only what insurers or third party "alleged" experts tell them are the facts. The industry stands on a threshold of facing massive regulatory operating constraints. The NAIC collects 100,000 cells of information per insurer and product. The NAICs database still is unable to tie transactions together because it doesn't actual track the position of products in the marketplace or connect their performance in near time or real-time. Similarly, it is entirely dependent on third party reporting to assess values. This raises significant solvency systemic risks that need to be immediately resolved.

The system and, separately, an insurance/reinsurance system puts all financial products through a related and in some cases common sieve, through a funnel that measures the attributes that are associated with each data report and system credit, whereby one can measure the attributes of each transaction against the same or similar attributes of other transactions, then the entire structure and the placement of each product all becomes much more efficient. The attributes may be definitional standards such as size of transaction; technical standards, such as loan-to-value, debt-to-income, credit score; or Governmental standards, such as FHL or Fanny Mea eligible or percentage of government guarantee. Granularity of information makes the market easier to monitor. Importantly, to regulators, one of the political fall outs of Spitzer's investigations was Congress blame of state oversight. Even if Congress wanted to, it cannot solve these economic problems in an informational vacuum.

The invention compares multiple insurers/lender, their products and attributes and permits the insurance/loan seeker to choose the one that has the attributes or underwriting standards that are important to him.

Any regulator of financial products can use their signals from commonly captured data. Spider software can look in up to now closed files such as pdf files with semantic searches to find attributes and reveal risk characteristics. Financial products are searched for their attributes to reveal risks. Analytics can be defined going forward.

The invention contemplates a system for valuing, the placement and/or performance of insurance/reinsurance and/or loans/lines of credit by such factors familiar to those skilled in the art:

by what risk factors,
by what delivery means or channel,
with what claims history per premium dollar,
by product,
by ROE or ROI,
by what diversification,
by what reinsurance counterpart,
by what rating,
by what time frame from inquiry to placement, and/or
as a factor of the time per term per product.

The power to change individual pricing in real time by state or locality or other factor or combination of factors results in greater control of risk diversification. Risk is measured from initial inquiry through issuance to clearing house to registry, with or without performance history—thus yielding full transparency across life cycle.

The invention uses progressive granularity and availability of information to induce usage. It uses netbacking to induce usage. It provides convergence of information flows. It uses information flows to move profit margins away from products. The invention is capable of establishing a universal clearing house for all financial products.

Despite potentially enabling technologies, it is presently impossible in virtually any industry to assess the entire food chain from initial inquiry to application through pricing, funding, product fulfillment, registration and subsequent performance. The result is an inability to judge or compare across products, services and industries: conversions at each step of the process, pull-throughs to completed orders, effectiveness and subsequent performance of specific wares, types of assistance and markets. The invention addresses these problems.

The invention identifies fundamental problems in the financial services and insurance markets and offers a solution. Many of the problems in the markets arise from inadequate information, inaccessible information, and no current (real-time) information. Regulators are obliged to rely on historical data, available to them only well after the fact, and only to the degree that the regulated entity allows access to information about operations. This limited and untimely access to information inhibits the efficacy of regulatory initiatives. The inability to accurately determine pricing or transaction terms, contributes to market illiquidity and operating inefficiencies for market makers. All market participants are negatively impacted by their inability to access sufficient information to allow accurate pricing.

The invention's solution creates Transaction Credit system credits which provide immediate economic benefit to the market participant. This is accomplished by linking information to each and every fee charged for a transaction. The credits and the database are displayed electronically. These credits act as a unique, multi-faceted mechanism for accessing all data and activity in the system. The result is increased transparency of the markets.

Use of the credits, which offset the cost of future transaction fees, or the cost of information, encourages more transactions, generates more market data, and demonstrably improves market liquidity, calming markets. The Transaction Credit system credits act as an unobtrusive window into market activity for regulators. Market-makers use of the credits effectively promotes additional transactions which pump more money into the system.

This invention is adaptable to any operating system, drives business volumes and directs market shares. It lowers operating costs and improves operating controls. The unique transaction platform and database functions as a central information clearing facility for financial product. Each transaction is "tagged" with a Transaction Credit system credit and both the data and the Transaction Credit system credits are displayed. The system enables the unique, real-time monitoring of market and transaction data. All market participants benefit from access to this better and more timely information, resulting in more accurate pricing, as well as improved risk prediction, mitigation and avoidance.

The job of regulators is becoming more complex and sophisticated as insurance and capital markets converge. Insurers are increasingly involved in investing in, and/or insuring, capital markets products. But here too the market has not successfully cleared the risks. The current crisis can be seen to be rooted in the fact that we have organized the broad financial marketplace into discrete silos that do not properly link transactions and free-flowing information. Each party defines their business circumstance uniquely—and to their own benefit. Separate organizations each fly their own flag and ardently refuse to cooperate in a consistent way, except to add individualized costs to each transaction, each trying to convince the customer of the value of their institution alone. Most every consumer and market participant has had the experience of the exasperating, bewildering search across the financial food chain for an appropriately-priced product and a targeted execution for their unique needs.

If, as it is often said, fear and greed rule the markets, then surely a time of potential global collapse presents a real opportunity to re-write the rules, using correct and appropriate definitions, and using modern tools and logical incentives to restore calm. This same fear and greed also impedes recovery as there is currently no alternative, unified system that exists for transacting that also gathers and analyses all information in real time.

The Solution of the Invention

The invention is a free market solution for the freeing of market information flows so that they are added back to the contract in near time or real time after it has been formed. This is not about additional legislation or additional regulatory bodies or enlarging the federal government. This is about enabling the existing state regulatory bodies to fulfill their mandates by putting in place appropriate and necessary 21st century information tools.

In about October, 2004, Eliot Spitzer found alleged fraud in the insurance industry and blamed the state regulators for missing it. Further financial problems were encountered with Hurricane Katrina. More recently the housing mortgage crisis has evolved. The need for the invention grows with the severity of the current financial crisis. The invention includes notions of transparency. The inventive approach advances market clarity, risk analytics, principle-based accounting, and much more.

The invention focuses on creating solutions to the fundamental problems of the insurance and financial services markets of the last 10 years. The invention includes the methodology for an electronically-presented insurance data exchange that unites buyers, brokers, insurers and re-insurers for the sole purpose of creating data and statistics to clarify policy terms, price, and underwriting standards—and to reduce costs.

The answer to the financial crises, a clear and naturally-grown-through-competitive-forces solution, lies in the proposed tracking credit that follows a transaction, carrying an economic benefit and identifying all descriptive aspects of price, terms conditions and final asset performance. Counterparts that can elect to be transparent (including all product providers and consumers) can be encouraged with pure economic benefit to provide whatever regulatory details are deemed necessary to comply with both established and evolving rules. The economic incentives occur in the form of clearly lower costs and can be further supported by a broad range of other regulatory incentives.

All regulators need to see and be able to understand ALL elements of financial product creation and performance in order to begin to determine both investment suitability of the particular financial product for insurers and/or proper risk analysis and pricing for the consumer, as well as proper market conduct.

The regulatory body such as the NAIC might consider sponsoring a search for ALL appropriate market analytics, as determined by all questions and complaints offered by all parties. The "Infomediary" piece of the inventive model focuses on this kind of transparency and, over time, new products and services will grow to support more granular information. At present, the regulators do not understand how the products in which the insurance companies invest are created—or by what standards. Here is an example: rating agencies and regulators alike routinely accept 99.9% or 99.99% product performance assurances offered by product providers, lenders, insurers, investment banks, etc. But, doing the mathematics, one can see this actually means that losses of one in one thousand or one in ten thousand risks are considered acceptable. As the subprime market debacle shows, massive markets (such as credit derivatives, bonds insurance, securitization, municipals, etc) can be disabled with this sort of seemingly safe risk when it is played out against magnitudes of multi-trillion dollar markets. (There have been more than $700 trillion in derivative risk instruments owned world-wide.)

The invention proposes that all market participants open their loan-qualifying and risk transfer underwriting standards, as well as their associated contract prices, terms and conditions, to one another in a system. Transparency and market standardization used jointly are proven method of increasing business volumes and lowering the costs of risk transfers. When accompanied by the patented comparative focus on underwriting standards and statistics across all forms of financial contracts and paired with the patent pending claimed inducements for use, the system works to deliver a seamless whole. The demonstrated approach works, as well, for all financial instruments having primary and secondary markets and market intermediation, as well as for related derivative securities. It is intended that such a system be entirely volitional. It will experience a natural growth curve, because trade participants will be clearly advantaged by greater market share and consumer acceptance—as well as access to increasingly important and detailed strategic market data and analytics. Financial market regulators must be able to access and understand both transactional and operational process down to the smallest metrics if they are to safeguard the system.

The inventive model rewards transacting counterparts who are willing to be transparent with more business at lower prices. The competitive process will grow volumes, reduce the costs and significantly increase gross profits—but at lower spreads. Ratification that the entire process (from earliest inquiry to final placement with an investor) is in full compliance with current regulation, offering transparent, competitive terms and conditions, can be easily signified, at-low-to-almost-no-cost, to the marketplace. The invention proposes using what we call "The Seal of the Deal™". This proposed two-part process begins with a "Deal Seal™" that confirms that the product origination process is orderly and conforms with accepted rules of fair practice from earliest inquiry, going forward; while the designation "Deal Sealed™", the second part, means that all transactions and performance characteristics are being tracked, monitored and fed into a universal database (in a way that complies with the most current regulation). The resulting database improves financial risk prediction, mitigation and avoidance by flagging all discontinuities in market function. The designation and the data can be under regulatory control, with the financial trade paying to display the designation.

The key feature of these models is a credit system that demonstrably reduces costs to all participants, as it improves information (i.e. transparency). It is the engine and the fuel for all these models. Comparable to credit card incentives, this visible electronic real-time display of Transaction Credit system credits derived from transaction fees is accessible from each transaction platform—each business silo—and is unique to and for each user.

The credits "buy" lower fees for the next transaction and/or for access to strategically critical market information. The credits are defined by each recipient of a fee for each transacting client—and these credits can, optionally, "travel" across transaction and product processing platforms, at the sole discretion of each business. The credits have the effect of creating strategic alliance treaties between competing business models, bringing the markets together, and functioning as ubiquitous tracking devices.

This is a linking technology. Transaction credits work as simply as paper clips or Post-It Notes® and can connect transactions in innumerable ways like some present day financial "Velcro®". They increase market participation and reward the transparent, active customer most. Importantly, since the credit assignment and their respective term are under the direct control of the management, market shares can actually be directed to underserved sections of a business.

Addressing the de facto threat of a dysfunctional financial system provides a historic opportunity for states to provide leadership in the creation of a solution. There is precedence for the states asserting such leadership.

The invention contemplate re-building a software platform in a manner that conforms to the ideas described herein: "a transaction platform linked to market information."

The interests of the nation and the financial services industry can be further enabled by beginning to distribute the risk transfer of the $200 trillion market of catastrophic environmental risks with carefully defined and carefully controlled products. The markets can be grown out of their present dilemma. The cost of distribution of these instruments (as well as the costs of past mistakes) can only be borne by truly transparent markets that price risk appropriately. Importantly, there are lessons to be learned from the current crisis that must never be repeated, if the nation—in the form of the integrity of its currency, a country's most basic measure of value—is to survive.

Confidence comes with transparency.

Transparency comes with increasingly defined granular market information.

Free flowing information alone can restore confidence in, and restore calm to the markets.

Creating systems and solutions that support the development of financial products addressing the problems positions both the nation and the world to re-focus priorities and actually grow markets going forward.

The key problems left unaddressed by current regulatory structures are:

a. Financial markets regulators must have access to appropriate and reasonably granular market information, including comparative analytics, performance reviews (by individual investments), operating metrics, etc. At a minimum, there must be contractual clarity (to properly assess issues of moral hazard and risk), as well as real markets, preferably price and terms in real time. Because regulators do not currently have access to sufficient data they appear frequently too overwhelmed to think: regulation suffers.

b. Financial markets regulators often leave their jobs to go to work for the institutions they regulate, meaning that their results can (however unwittingly) be biased in their analysis in favor of the institutions they regulate. (An example: Recently, an insurer declared that a $2 million life insurance policy had lapsed, while electronically generated bank records proved the contrary. Absent any appropriate statistics on lapse rates, the regulators found for the insurer, refusing to cross-reference the records provided that reveal a fraud against this consumer. The Attorney General has since written in behalf of the insured to the Insurance Commissioner and the matter will be reviewed. But statistical analysis of comparative lapse rates would presumably reveal the reason behind the insurer's bias.)

c. Financial markets regulators often permit regulated entities to determine the rules by which they are regulated—meaning that even those who might abuse the system for financial advantage get to opine freely on how the measures are to be interpreted.

d. Financial markets regulators consider measures of a 99.9 or 99.99 percent statistical certainty of risk avoidance to be appropriate. However, this level of certainty still allow for errors in between 1 in a 1000 and 1 in 10,000 circumstances. That result is unacceptably when implicating multi-trillion dollar risks or markets.

e. The frequency of occurrence for a peril or hazard is different than a measure of frequency occurrence for a particular risk of a particular severity.

f. Experts claim it will take 50 years to move from current statistical measures (Gaussian math) to ones that properly predict the frequency of a particular risk severity.

g. Data density increases dynamically the perception of frequency of a risk (i.e. today's more sensitive measures make risk seem to occur more often).

Market convergence has not caused "straight-through processing" in financial services, or any unifying force that connects the transactional food chain and would reduce wholesale and retail sector costs in insurance and reinsurance, loans and lines of credit.

The way that regulation functions means that the framework is constantly fragmented. This is called the retail/wholesale market disconnect. (For example, in capital markets, there is currently no price/term discovery across market sectors, meaning the critical linkage is lost between: time; initial inquiry; primary market execution with price and description of risk; subsequent performance of risk; secondary market pricing of risk; etc. If these separate market aspects were connected by a clear economic benefit; costs would come down, volumes would increase.)

Current risk measures are proven inadequate by the nature of the current global crisis. Holding companies must all use comparable measures with clear explanations for any divergences from a standard.

A methodology must be used that connects all links in the marketplace chain in a seamless process that encourages market efficiency through pure economic benefit. The invention creates a related, market solution for the insurance industry.

Key objectives of financial regulation are:
 a. Price/term discovery;
 b. Standardization of work and process flows, operating metrics, underwriting standards, risk and performance measures, documents, etc.
 c. Clarity of risk description;
 d. Operating efficiency; and
 e. Ease and cost of audit.

Government guaranteed institutions must have at least the same—preferably stronger—standards than those that exist for un-guaranteed institutions.

The cost of money is the stabilizing element for all unregulated institutions because it is presumed to be correct, risk variable and market priced (except for fraud).

Granular data, analysis and operating metrics are a requirement for proper market oversight.

The absence of data and analytics and uniform work and process flow measures consistently blinds regulation—just as it impedes the marketplace where best information is a proven determinant of performance. The invention proposes use of a Transaction Credit system credit that buys access to both lower next transaction costs and lower costs of access to information. This approach should result in a "viral" adoption of a uniform set of basic principles of regulation.

The consumer has his interest consistently ill-served by financial market regulators (at least when it comes to insurance and banking/lending markets) because the markets remain opaque. Injection of transparency, strategic market intelligence that reveal critical information and advantage, needs to be structurally induced with an economic incentive.

State regulators are the "critical canary in the (financial) birdcage" on a local level, as no federal response is presently available. However, any form of regulation is impossible without access to proper data and analytics.

The United States is the acknowledged leader in both market creation and technology. It should use these strengths to define and re-define the regulatory (and transactional) space to meet its needs. The recent sales of transaction platforms to foreign interests indicate the value of these assets. Keeping them under domestic control can best occur by linking transactions (The Financial Marketplace) to information (Technology).

Depository Institutions

Various structural approaches to the existence of depository institutions can co-exist if there are common visible marketplaces, with data and analytics that reflect the precise financial circumstance, along with standardized documents, clearance functions, etc.

The optimal approach to all markets is that they are wild and free, volatile, visible and subject to legitimate market forces (including fear and greed).

If the above is true, central bank regulation is able to better focus on policy issues, leaving transactional detailed analysis to local authorities or appropriate agencies.

No solution is appropriate if it does not have conventions that actually induce usage through economic and strategic benefit in the on-going creation of an efficient, transparent marketplace.

The consumer must always receive a proper regulatory response and, should that response not occur, the consumer needs recourse through multiple branches of government.

Insurance

Federal interests must focus on limiting all possibility for subsidized markets. Insurance and banking—like all financial services—are best left wild and free, where competitive forces prevail over time.

All markets need more operating and pricing efficiency—and this comes from lower costs, which clearly and inevitably, results from the approach of the invention.

Securities and Futures

All financial markets are united in the sense that they provide different solutions to risk transfer: standardize the marketplace and you standardize products and operations. Some risks are local and require state regulation. All solutions require standardization of work and process flows and the resulting descriptions, data/analytics and operating metrics. Regulation is always best when it is limited by any particular need, other than a search for what actually is occurring in the marketplace. This can only happen in an efficient market—one that is governed by the rational search for the incremental profit dollar.

All regulation must be balanced, weighing the needs of the consumer at least equally with that of the institutional investor. All market sectors need to be united and subject to a common measure, one that finds them "the best deal" at the lowest cost. Liquid cash markets lead to liquid futures markets, which in turn lead to liquid options markets. This can only occur when the arbitrage between the sectors is exposed to competitive threat, which occurs when the sectors are made transparent—as can happen immediately by using the solution of the invention in a visible setting that evidences clear economic benefit.

Moore's Law initially postulated doubling data chip densities every 18 months. Decades later, this law has placed massive data density in the hands of the potential analyst. Still, there remains no consistent approach to unite, collect and deploy the data and use it to clarify financial markets. This must change if the marketplace is to properly clear the necessary risks in a cost-efficient manner.

The inventive solution is applicable to all financial markets and includes immediate market acceptance due to lower transaction costs. It includes:

An electronic display of specific economic credits that, at the option of the participant, can be used to buy low cost variable term, discounted access to future transactions and/or related market information;

The capture of all data related to a transaction resting in an "Infomediary" section of the marketplace with disclosures induced by a strategic or economic benefit;

A credit display of linkages that create a seamless chain of work flows: "straight through processing"; and/or Low cost entry and exit of new products/services, resulting in a more vibrant marketplace.

Benefits of the inventive solution to insurance/reinsurance and loans and lines of credit include:

Market intelligence: access to all necessary information about the counterpart and the proposed, or executed, transaction;

Standardized data structures for documents, clearance, communications, risk performance, etc.;

Cross-sector arbitrage, enhanced by per producgt risk-differentiated cash, futures, options and indices;

A listing of unique, fungible, and ubiquitous credits, available to participants and based on paid transaction fees. It is usable for a defined term and functions as a clear economic benefit in the form of a cost reduction of either the next transaction fee or access to strategically critical market information;

A branding mechanism that offers a distinguishing feature that defines a fully complying marketplace, with counterparts that perform as expected; and/or Transaction driving credits as credits drive transactions, which results in viral growth.

The result is lower costs, improved liquidity, greater revenues, growing market shares for participants—a vibrant marketplace that is always stimulative to the economy without being inflationary. The invention rivals FNMA and FHLMC—it covers all products (not just mortgages), it has potentially full market reach (with potential retail, not just a wholesale, market focus), and global, not just domestic, markets. The invention includes a proposal for an exchange for insurance and reinsurance and forming an exchange for loans and lines of credit. The invention addresses issues of catastrophic risk exposure facing the nation, as well as broader issues of risk transfer and distribution.

The bond insurance crisis highlights deficiencies in the availability of information relating to disclosure of statistical descriptions and analyses that would enable market participants to better assess risks and make informed investment decisions. The inventor has offered the following observation and solutions to the credit and liquidity, as well as bond insurance crisis:

The crisis is caused, in part, by the absence of real-time information flows, focused on reliable price and term "discovery" which, in turn, contributes to market illiquidity and operating inefficiencies to the detriment of all market participants.

The solution is to link information to transaction fees to generate Transaction Credit system credits that are visibly displayed on an electronic screen. These Transaction Credit system credits can then be used to offset the cost of future transactions or information and analytics.

According to the invention, what is needed are two things: (1) a new framework for disclosure and reporting of comprehensive data and analytics pertaining to all financial instruments, including loans, lines of credit, other financial products, as well as insurance, reinsurance and securitized insurance risks; and (2) a new transaction platform, an "Electronic Communications Network" (ECN) or other data highway, like the Internet, in which financial products are bought and sold and where detailed data on the composition of the assets, and of the transactions is collected, stored, and displayed. This data is available, wherever possible, on a real-time basis. The activity on the ECN is fueled by the Transaction Credit system credits as buyers and sellers redeem those credits to either do more business, or to access market and product information.

Focus is on securitized insurance risks in the financing of catastrophic risks, the impact the recent bond insurance crisis is likely to have on that effort, and outlines of some options for solving the catastrophe insurance and credit market crisis through the creation of more efficient and transparent capital markets. Particular attention will be given to the Homeowners Defense Act of 2007 (H.R. 3355/S. 2310) that includes a provision to create a state-run National Catastrophe Risk Consortium that would:

act as a centralized repository of state risk information that can be accessed by private-market participant interested in underwriting risk-linked securities or entering into reinsurance contracts . . . (and) use an acquired catastrophe risk database to perform research and analysis that encourages standardization of the risk-linked securities market.

See CRS Report RS22756, The Homeowners' Defense Act: An Overview, by Rawle O. King.

The National Catastrophe Risk Consortium ("Consortium") envisioned in H.R. 3355/S. 2310 would aggregate catastrophe property risk from participating state-sponsored risk transfer mechanisms and transfer that risk to investors in the private capital markets. The Consortium is premised on finding a low (or lowest) cost risk financing solution that generates market competition by exposing risk transfer opportunities in a way that makes evident the cost savings for participants using the system, possibly in real (or near real) time.

In theory, the Consortium envisioned under H.R. 3355/S. 231 would be set up to facilitate transparency in risk transfer markets in the process of clarifying market opportunities for growth for both standardized exchange-traded derivatives and highly customized over-the-counter (OTC) contracts tailored for a specific buyer, lower the costs for the consumer and effectively induce usage. Given the fact that portions of the voting public remain cynical concerning the efficacy of any specific government solution, a model is necessary to which everyone can relate, and believe in, and that clearly reduces costs while increasing both competition and financial innovation in the marketplace. It is critical that the economic benefit—the determining value proposition—be evident to all users of the Consortium in a manner that provides sufficient incentive for universal participation. Some economists would agree that this can best be accomplished by letting pure market forces determine the specific convertibility of credits into services, in terms of both price and time and (optionally) displaying the result.

The Consortium could use the inventive systems and methods described herein.

Transparency in Capital and Risk Transfer Markets

Most insurance market experts would agree that solutions to the catastrophic property risk financing problem will require financial innovation and access to capital from outside the insurance and reinsurance industry. However, financial innovation and the rising importance of alternative capital pools (i.e., hedge funds, private equity funds, sovereign wealth groups) for financing insurance risk could raise challenges in terms of the evaluation of risk, correct identification of the ultimate bearers of risk, and proper assessment as to whether they can manage it. There is nothing wrong with complex financial structures so long as there is disclosure and analysis of pricing and risk facing market participants.

Opaque Capital Markets

Economists have observed that the crisis in the credit markets called the "subprime mortgage crisis" arose in part because investors did not exercise sufficient due diligence. The problem is one of moral hazard: the market must provide sufficient incentives for proper performance so that individuals acting in their own best interests cannot end up being bad for the system as a whole. Such problems undermine the very meaning of a contract which, in turn, reduces belief that the risk will be cleared by the market. It is not uncommon for bond brokers and dealers and dealer and commercial banks to use outdated or unrealistic prices to value their portfolios and to price securities. For example, they might not publish quotes, and money managers and other investors might not have a way to determine with certainty the value of asset-backed securities in mutual funds, hedge funds and other investment vehicles. Risks must be clearly defined and contractually assigned in ways that can be tracked in order for contracts to retain their meaning.

The argument goes as follows: Investors were impeded in exercising due diligence by a lack of transparency and disclosure about the risk profile of new structured financial instruments. Transparency in the pricing and terms of securities is essential for financial market efficiency. Transparent financial markets should, by definition, have provided accurate information to allow for transactional price and terms for securities and financial instrument of all types in real time to be readily available to everyone, encouraging market participants to entrust their money to the markets.

In October 2007, as part of a broad initiative to study the competitiveness of U.S. capital markets, the Department of the Treasury undertook a broad review of the regulatory structure associated with financial institutions. The purpose of the study is to find ways to improve efficient, reduce overlap, strengthen consumer and investor protection, and ensure that financial institutions have the ability to adapt to evolving market dynamics, including the increasingly global nature of financial markets. See U.S. Dept. Of Treasury, "Review by the Treasury Department of the Regulatory Structure Associated with Financial Institutions," Federal Register, no. 72, Oct. 17, 2007, p. 58939.

Officials within the U.S. Treasury have also signaled the importance of information and transparency in capital markets. In a speech before the Euromoney Bond Investors Congress in London on Feb. 27, 2008, Phillip Swagel, Assistant Treasury Secretary for Economic Policy, commented on the U.S. economy. He observed that providing better information will likely be one of the main recommendations that will come from the analysis that the Treasury is undertaking into the underlying reasons for the housing and credit market crisis of 2007-2008. He noted that a lack of transparency and easy access to information is at the heart of the disruption that has affected both market participants and more broadly the global economy. For this reason, the Treasury is primarily focusing on the lack of availability and use of information about the quality of the mortgages underlying MBS, CDOs and the range of related instruments, as well as ways to improve market discipline in the areas of disclosure and due diligence. Limited access to and limited demand for information throughout the securitization chain facilitated lax underwriting standards. Market participants, Swagel noted, had the incentive to demand such information but, because of expectations about continued home price increases, there was a reduced level of due diligence.

Transparency and Data Availability in Capital Markets

A standard framework for the collection and disclosure of asset-level information that will help capital market participants price risk and thereby aid the market to achieve on-going price adjustment. Access to information can be improved through the activities of a national catastrophe financing facility that collects and disseminates critical catastrophe property risk information to the capital markets and acts as a financial intermediary for managing and insuring catastrophe risks—i.e., a new, national framework for managing and insuring risks of large-scale catastrophes, initially environmental but in time extending to all risk transfer. Existing insurance industry organizations and institutions, such as the Insurance Services Office (ISO), enable insurers to achieve and share economies of scale in the collection and analysis of data, but these organizations have not completely dealt with the unique underwriting and pricing requirements for catastrophe insurance.

Electronic Transaction Platform for Trading Catastrophic Property Risks

There are a number of possible modes of implementing an efficient electronic transaction platform for trading catastrophic property risks, but an exchange platform seems to be most feasible because it is a familiar construct; and, such a centralized utility facilitates transactions and associated data collection. One could, for example, run a transaction platform as a central marketplace for all markets, a single platform through which all others could transact. What is key is a linking mechanism such as the Transaction Credit system credit. This methodology keeps the cost of participation low; and, an exchange platform is a flexible structure which, when coupled with a database, may even evolve into a search engine for the financial industry—an interesting path for long term industry development, a logical extension of the nation's proven skills in market creation and information technology.

The Homeowners Defense Act of 2007

Lessons can be learned from the current bond insurance crisis to help policymakers ensure that the same mistakes are not made with respect to catastrophic property risk transfer when implementing Title 1 of H.R. 3355/S. 2310—the Homeowners' Defense Act of 2007. This legislation would create a state-run facility designed to allow states to pool catastrophic risks, divide that pool into portions sold to a wide range of investors through direct placements or in over-the-counter markets.

On one level, what is proposed is the abandonment of the individual silos of 18th-20th century business models—in favor of creating a 21st century union of all forms and methodologies for credit risk transfer that result in financial products. All risk transfer, whether insurance- or capital markets-related, can be allowed to compete on an open playing field. Understanding that such a proposal allows for the inevitable market excesses, and occasional disruptions, that come from truly free markets, allows us to see the reason for regulation, which in turn requires data and analytics to keep it informed. The invention proposes new methodologies that link transactions directly to information.

An important consideration is cost. Running a competitive auction to the best bidder for any type of risk transfer is estimated to cost approximately 50 basis points (½ of one percent) in this system, as opposed to a maximum NASD-mandate cost of 500 basis points (5%) or more typical insurance/reinsurance spreads of 1000-1500 basis points (10-15%). Clearly the functions are not precisely comparable; but, overtime, the resulting but long-avoided market transparencies can be expected to result in massive saving to the consumer. Presented against the entire market of $200 trillion in annual catastrophic risk transfer, the savings between present 10% annual gross margins and 0.5% auctions, in which end users can participate along with intermediaries, approximate $19 trillion annually. The nation could lead the world in creating such a solution—and our notions of wedding capitalism, market creation and capitalism could be exported, as it is expanded to include many other types of risk. Most important, as the analysis and the market itself becomes more granular over time, new elements of risk prediction, along with risk mitigation, possibly avoidance, could be created. New products will be priced to a consumer who once again can rely on the financial markets to clear risk efficiently.

The solution of the present invention is applicable to any financial instrument and market participant for which there is a primary and secondary market, and intermediation. These include loans, lines of credit, as well as insurance and reinsurance. Revenues flow from incremental transaction fees or the purchase of information. It is simple in the same way that a paper clip, or a rubber band, or a ball bearing are each very simple, adaptable, and useful in their design. The solution is a universal Transaction Credit system credit that conveys an economic benefit, displayed electronically, that fosters the development of an "Infomediary".

One should look for low-cost ways of improving transparency in all credit and insurance markets. We should try to grow the market out of and past its current inefficiency. To accomplish the cost minimizing efforts in setting up the electronic facility, the Consortium could charge a "transaction and/or data access fee" generated from either the primary or secondary market that would contain a comparable credit used to off-set the cost of either access to associated transparency-creating market information, or a second distribution-related transaction fee from another market sector. This credit will be used to support this facility thus offering a more efficient and volume-enhancing electronic distribution network for a full range of financial products, including financial products that affect all forms of risk transfer. The result gives clear, economic and strategic advantage to the system user and induces usage, generating business volumes.

Sitting at the nexus of product creation, transaction and pricing is a measure of fees, associated credits and remaining terms of use, which buys economic and strategic advantage for users through provision of critical market information. Such information is—without limit—a description of: individual risk(s) covered; specific financial exposure per product; amount of government coverage of potential loss; diversification or incidence or percentage risk per investment pool; original and subsequent market pricing; and market volumes—an effective "ticker" available in real time. This measure can be superimposed on an existing, de facto marketplace. It can be organized using today's technology and financial skills, open to all, enhancing—but not disturbing—the marketplace.

The inventive solution can be applied to resolve the problem facing the bond insurers. The problem facing bond insurers stems from the fact that they are part of a chain of investors that purchased assets or instruments without knowing exactly what they were investing in. The banks made loans to certain borrowers, effectively adjusting their lending criteria and standards to suit a broader class of borrowers, thus accommodating more of the financially weaker borrowers. The key was in banks setting interest rates at ever lower levels, with the expectation that borrowers would be able to support higher rates later on in the life of the loan. Those loans were pooled, wrapped, labeled and sold as "asset backed securities."

But the magnitude of the weakness of the individual borrowers was not disclosed on a per contract basis. Indeed, it was not readily discoverable because the details of the loans were not available. The financial guarantee companies (bond insurers) were then providing evaluations and ratings on the credit quality of the banks' loan portfolios, and of the asset backed securities, without really knowing the precise composition of the loans. In other words, the root of the problem lies in the absence of, or lack of access to, full and accurate information (i.e., "transparency").

The solution of the present invention tracks the composition of the assets or financial instruments and details of transactions as they occur. If it was paper we would put paper clips or "post-it" notes on all or certain pages of the documents where critical information is to be found. Instead, imagine a Transaction Credit system credit was "stuck" onto each electronic file containing the details of a transaction. The Transaction Credit system credit has at least five valuable features:

It provides economic value in that it can be used to offset future transaction fees, and/or to offset the cost of acquiring transaction and market data.

It provides incentives to conduct repeat business as participants are more likely to use a credit with real value. The credits also have terms—the precise definition of which can be used to induce usage.

It is tradeable.

It is structured to reduce cost of regulatory compliance. Financial service regulators would find the concept of the credits intriguing because reviewing a flow of credits reveals market sector activity by business volumes, and product demand on an increasingly granular basis. The database provides insight into progressively more detailed information that otherwise must be collected through a much more labor intensive, time consuming and costly process of on-site examination and review of the regulated businesses.

It is a tightly-focused new tool for public policy, a clearly non-inflationary economic stimulus, with immediate application. A Transaction Credit system credit "grafts" to any transaction platform or technology and immediately targets "search" functions. It is searchable. A search engine can search credits. A search engine can search for attributes or terms of financial products.

The inventive system would receive immediate market acceptance, because it accomplishes demonstrable cost reduction, from a broad range of financial market participants who understand the products, assets, instruments and risks currently being traded in the capital markets. Participants would see visible (electronic) markets in real-time to offer the most competitive pricing and terms. The structure would facilitate low cost entrance and exit of products and services in a targeted response to market need. The structure will deliver greater revenues, allow participants to grow and direct market share according to the credits they grant (or accept the reality that non-participation always loses it), create more product to respond to the needs of the market, and ensure ongoing expanded opportunities for profitability through the transaction of a credit index that allows participants to actually hedge the advent of transparency.

Credits travel across all transaction platforms and information, process/work flow enabler in the full food chain for both financial products and commerce in general, whenever and wherever a transparency-creating event occurs. This is meant to include even contract performance on a granular level experienced by the investor or a service provider acting in his interest.

Track-able linkages are formed between and across different silos in the chain. The credits themselves in any form or format may form the linkages through which the information is exchange and/or embedded.

The invention includes a search engine based on totaling up all credits unique to an entity, as just one aspect of a variety of different search algorithms based on the collecting of Transaction Credit system credits. It specifically does not exclude other groupings that allow for Transaction Credit system credit fungibility.

Analysis of metrics similar to those disclosed in U.S. patent application Ser. No. 10/859,017 filed Jun. 1, 2004 and entitled "Monetizing Declined Applications for Credit" by the present inventor and incorporated herein by reference, across an inclusive network of participants to reveal anomalies in product performance (such as when a contaminated product entered a financial system) can be used to predict, mitigate and possibly avoid risk.

A financial contract—the jurisprudential basis of all loans and lines of credit, insurance and reinsurance—is not a static instrument. Indeed, all sorts of risks are effectively contained and described in its underwriting standards, its associated statistics and transaction details, all effectively contained in the sum of the contract, what might even be referenced as expressed in its terms and conditions.

Increasingly in times of credit tightening, it is useful to add back information to a contract in real time, information that, by itself, might impact either the credit worthiness of a contractual counterpart and/or the value of an asset.

The present invention links all: transaction platforms (exchanges, clearing banks, loan seekers and lenders, insurance seekers and insurers, inter-dealer or wholesale brokers and the last stage investor) as well as their process and work flow enablers, credit raters, information providers—any and all in a linked series of transaction platforms complete with a information resource in a single data processing system.

The linking element is the system credit which contains a direct or indirect reduction in cost of subsequent related transaction fees or in access to strategically critical market information. The system credits are a limited term grant of financial advantage that are effectively traded for transparency creating information.

Transparency without clarity has little use. So analytics embedded in the system credit to add value to the information—particularly if it affects either the costs of risk transfers or the valuation of an asset. Algorithms related to the system credits are used to search for the best deal, or to create indices that measured the use of credits (as one measure and hedging tool for the onset of transparency) and/or the development of a credit wallet, a new type of credit card that supports financial market transactions that allows for the aggregation and exchange of different kinds of system credits.

The present invention stands at the intersection of transactions and their information, updating each contract with actual financial performance data. The updated data re-creates value in old financial contracts by attaching new, relevant, value-establishing data. As a result, market function is restored or improved and made more liquid by re-tooling relationships between existing market participants and transaction platforms to track critical information. Those who participate grow greater market share, incremental revenues and clearer value. The financial market participants pay the person who voluntarily provides the fresh data with the Transaction Credit system credit.

The present invention is particularly directed at a systems and method of putting back information into a contract after it is formed relating to its covered risks, as expressed in its underwriting standards and transaction details, and tracking them all going forward in time. The embedded data structures relate to underwriting standards and transaction details and updated risk factors. The Transaction Credit system credit can be used to fund actual purchases, charitable functions, gift-giving, and public policy resolutions.

The present invention is directed at a solution such as the real life problems which led to the massive interventions by the Federal Government to support AIG in 2008 and 2009. AIG's financial problems arose in the operations of its Financial Products Group (AIGFP). AIGFP products were based on leveraging the value of the AIG AAA credit rating. AAA ratings can change over time, and as AIG's rating fell, more and more capital was required to keep AIGFP's business model operational. In the process, AIGFP took on ever greater risks/excessive risks—all still linked to the original AAA bond rating of the parent.

AIG had a system, "the position analysis and storage system" (PASS), designed to assess the necessary "market, accounting and transaction details". This system failed in large part because of the extreme efforts within the financial services industry to keep markets opaque by hoarding, not sharing, critical information. This absence of consistent measures of cross platform performance data made it impossible counterparties to properly assess risk. Ultimately, there was a gross miscalculation of risk. AIGFP reportedly made the assumption that a perfect storm of financial reversals could never occur simultaneously, and therefore was a de minimus risk. AIGFP executives said the swaps contracts were like catastrophe insurance for events that would never happen. The absence of the necessary information to properly assess risks led to a near-complete failure on the part of rating agencies and regulators to properly perform their core responsibilities to maintain reasonable order and valuation oversight in financial markets and to consistently assess the risk of each corporate credit and financial structure in order to protect the public.

The present invention presents a data processing platform that is truly transparent, inclusive of all origination, distribution and investment entities. It conquers informational asymmetries and its accompanying adverse selection. This structure allows for comparative analysis across markets, transaction platforms, and products, in real-time and inclusive of actual up-to-date investment performance.

Comparative analysis is also necessary when considering accounting measures which artificially seek to "freeze frame" a company's performance into a single moment in time, often looking solely at mark-to-market, mark-to-method, mark-to-model price methodologies. Each is likely to be right or wrong for an instant in time but it is important to remember no one methodology necessarily conveys an accurate picture.

The present solution addresses these problems through a system which: provides all necessary information on an on-going real-time basis; diversifies risk transfers away from a specific and positive correlation with credit; establish a neutral marketplace for all risk transfer that incorporates insurance and reinsurance, and loans and lines of credit; allow a free flow of information: let all market participants have access to real time data feed on market activity that enables real price discovery; establishes genuine regulatory oversight, equipped with tools appropriate to the 21st century, which puts the interest of the people ahead of the interest of the participating institutions alone; and establishes genuinely autonomous credit rating agencies whose analysis and ratings are not "for sale".

The present invention may be implemented in data processing systems that manage all data related to financial transactions, prospectively linking all transaction platforms and exchanges and clearing houses, in loans and lines of credits (including mortgages), insurance, reinsurance, derivative products, and other financial instruments (collectively, "Financial Products"). As described above, such data processing systems induce widespread market participation through the use of "Transaction Credit" system credits; capture most, if not every, data point(s) relating to a Financial Product, from its origination to its maturity; store the data in a central repository; provide the data and analytics in real-time (or near-real-time) and in as much detail as desired, in a manner accessible to all market participants and other interested parties, including regulators; and, track all key aspects of the Financial Products in real time (or near real time), including performance on a per transaction basis, from first inquiry through origination to final maturity.

The data captured in the data processing system includes price, term, and risk; counterparty risk and other risk exposures. The system analytics software provides comparison of critical risk features, key attributes and operating measures of the financial products from origination to maturity with data from similar products both historical and current and can help in signaling market anomalies and emerging dangers.

For the convenience of the reader, the above description has focused on a representative sample of all possible embodiments, a sample that teaches the principles of the invention and conveys the best mode contemplated for carrying it out. The description has not attempted to exhaustively enumerate all possible variations. Certainly at the present time, regulatory oversight and enablement, as well as risk and asset valuation, remain a specific concern on a local, national, and global level. Other un-described variations or modifications are possible. For example, where multiple alternative embodiments are described, in many cases it is possible to combine elements of different embodiments, or to combine elements of the embodiments described here with other modifications or variations that are not expressly described. Many of those un-described variations, modifications and variations are within the literal scope of the following claims, and others are equivalent.

For a market to function optimally, there must be confidence in the meaning and value of its contractual obligations. Confidence in the contracts increases liquidity in the markets for insurance, loans and lines of credit and other financial products. Establishment and disclosure of standards, statistics, and definitions applicable to the contracts is fundamental to creating that confidence. This is achieved through disclosure of the terms and conditions of the individual contracts as well as the clear establishment of necessary underwriting criteria regarding all of the descriptive aspects and valuative methodologies of the risk or asset. The use of the invention enables the establishment of standards, definitions, and statistics necessary to optimal functioning of the market, and to creating reliable contracts. The inventive solution does not impose the terms and conditions of the contracts, but rather encourages them to be established naturally in the free market—exposed and fully transparent.

All markets "clear" risk (meaning that they price risks and transform them into acceptable and manageable structures) at what is called the clearing house price. The clearing house price is a function of many things, most importantly, comparable transactions. As a result, the more the risk can be defined and standardized, the more easily the market clears, defines and standardizes it. The result is enhanced price discovery.

If one were creating banking, insurance and capital markets business models anew, one would not be using models that are conceptually grounded in the 18th to 20th centuries. One would instead focus on 21st century technology and this nation's proven strengths in market creation. This country has long been esteemed for free markets, resilience, and innovation. The current breakdown in finance provides the opportunity to update structures and practices and to utilize current technology in devising a solution that supports growing dynamic financial and commercial markets.

The current business model for many companies and their regulators relies on periodic (monthly, quarterly or yearly) financial statements made that provide a snapshot of the company's financial position as of a historical date. Often, a company may hold securities among its assets that fluctuate in value, although the rules that surround how the different methodologies by which they may be accounted can be fixed. Those securities may be valued according to differing accounting conventions. For example, the Financial Accounting Standards Board (FASB) has issued standards for how firms should value such securities. Under these standards, the securities are categorized into one of three levels:

Level 1—markets determine pricing
Level 2—"observable inputs" determine pricing
Level 3—"unobservable inputs" determine pricing The securities in each level are valued at the beginning and end of every reporting period. The company describes the method of valuing each level of assets in its reporting. For Level 3 securities, the company should report information about purchases, sales, issuances, and settlements on either a gross or net basis.

However, during times of economic crisis, these approaches are not sufficient to provide an accurate valuation of securities held by a company. This is particularly true for derivative, pooled securities which are bundles of assets collected from different originators and repackaged and sold to investor companies. If the company's management does not completely understand the value of the assets they own, the financial statements they issue will be misleading to regulators and investors.

The present invention provides a way to gather information about an individual risk or asset within a security and will benefit regulators and investors by providing greater transparency in security valuation.

The present invention inherently changes this disconnect in value perception by updating all of the definitions of financial products in real time, inherently supporting proper market clarification, transparency, full disclosure of price and terms—with continuous re-pricings.

In accordance with one aspect of the invention, financial products markets where there are a first sector for origination of the financial products (such as sale of insurance, or making of loans to borrowers) and a second sector for resale (or chains of resales) of a fractional interest or entire interest of the insurer or lender in the financial product, data is captured in the course of each transaction involving the financial product. The data is recorded in a data storage system so that each financial product, and its underwriting standards, and related subsequent activity and transactions involving that financial product are stored. The recorded data includes the original terms of the financial product and its value, and the changed terms of the financial product and its value arising from external events or from the subsequent transactions, and original and updated valuations of financial products contracts bundled in a pooled security. One critical measure is the per contract performance level as measured by either its current or anticipated cash flows. The data report is provided in a predefined standard format and can be continuously updated with new, relevant information. The data report is available to parties that conduct transactions in the two sectors, and can be made available to government regulators over the full life of the financial contract or aggregation of contracts.

During application processes for financial products, including specifically, consumer-directed financial products, including but not limited to life insurance, annuities, medical insurance, homeowner's insurance, renter's insurance, automobile insurance, secured loans, mortgages, home equity loans, automobile loans, personal loans or lines of credit and unsecured loans, and credit card revolving loans, as well as business-directed financial products of the same type including mortgages for investment properties and loans and lines of credit provided for use as operating capital, offered by a plurality of offerors, information is obtained in the application processes.

Those applications are then examined in accordance with underwriting standards of the financial products company, and in a due course, a financial product is issued to the client/purchaser, and a future income stream is provided to the financial products company/issuer.

That future income stream can then be sold by the financial products company/issuer to a subsequent investor. The subsequent investor may pool together numerous such future income streams and sell the pooled future income streams as a pooled security. The end purchaser who buys some portion of, or the entirety of, the pooled security seeks to obtain a stable future income stream for their investment, but as recent experience has shown, it is not certain that the future income stream will in fact be stable. And if it turns out that the income stream is not stable, then the actual value of the security is not the value by which it was originally entered into the financial records of the company.

Furthermore, there may be deceptive or fraudulent practices associated with the financial products contracts. For example, product originators, trader/intermediaries and investors may take steps to obscure or enhance value. For example, using the triple AAA value of an asset or tranche without revealing that the risk element is so high as to reduce value; or holding securities or instruments that require notification of a third party in order to vary the terms and conditions/pricing of an asset so that timely notification is not possible; or the insertion of "the appearance of risk" to risk situations in order to enhance spread. (For an actual example: purchasing a large pool of assets having a presumed average life of 3.5 years at 89, then selling a large portion at 104 without applying the 15 point profit to the remainder of the pool to reduce the effective cost and associated risk).

In order to obtain an accurate valuation is necessary to go into each pooling of asset backed and derivative securities, breaking down each package into its component contracts. Each component contract in a pooled security is identified and that data is stored in a data file. The underwriting standards that were applied at the time of issuance of the contracts are identified and stored in data file(s). (The underwriting standards are the key risk descriptors unique to each contract.) Each and every element, price and term and condition, representation and warranty of each contract is identified and stored in data file(s). Data associated with each component contract is identified and stored in data file(s). The stored data extends through the applicable time periods of the contract(s), ranging from first inquiry through to current real time cash flow performance, with all of the information constantly updated and re-valued in near or real time.

The present invention in one embodiment is a data processing system having one or more program executing computers, and one or more data storage devices, which processes data captured in the application processes and in subsequent transactions. In particular, the invention incorporates one or more computer program products executing on the data processing system 101, which incorporate the following steps:

receiving or extracting or generating data elements regarding financial products contracts,
  determining valuations of the financial products contracts by calculation or comparison methods;
  creating a data report in a standard data format containing the financial products contracts data elements,
  storing the data report in the one or more data storage devices,
  receiving new data items regarding one or more of the financial products contracts,
  adding to or modifying the data report to create an updated data report incorporating the new data items,
  determining updated valuations of the financial products contracts by calculation or comparison methods, and
  storing the updated data report with the updated valuations of the financial products contracts in the one or more data storage devices.

The financial products contracts will typically comprise insurance contracts, reinsurance contracts, loans, or lines of credit, or subsequent and derivative transactions relating thereto, including reinsurance, and derivative securities such as collateralized debt obligations.

The data elements regarding financial products contracts can include one or more of insurance underwriting standards, insurance financial terms, insurance applicant data, loan application standards, loan financial terms, loan applicant data, or comparable transaction details, as well as valuative per type performance measures provided by third parties such as medical findings or appraisals.

Thus, for example, in the case of a mortgage, the data elements can include one or more of loan underwriting standards of the loan originator; loan terms such as the size or amount of mortgage, the type of loan (primary mortgage or home equity), the loan to value (LTV) and/or combined loan to value (CLTV) ratios, the mortgage rate (Fixed or Adjustable rate (including reset date)), appraisal value, appraiser name, the primary/secondary residence; the Origination Date, the holder of original note/location of assignment documents, prepayment history; and title search; and loan applicant data such as age, income, employment history/type, credit history, debt to income (DTI), and documentation provided.

The data report created from these data elements is in a standard format so that the data contained in the report is consistently searchable, combinable, and updatable. Thus, the data in the data report can be used to instantiate an OLAP cube for analysis of the data contained in the reports. The data elements can be stored in a relational database or other database. Alternatively, in a preferred embodiment, the data elements do not require a relational database and are stored with associated data tags to identify each data element. In the most preferred embodiment, the data tags are XML tags. In one version of the preferred embodiment, the standard data format is an XBRL (eXtensible Business Reporting Language) data format.

New data items regarding one or more of the financial products contracts or contract elements might include one or more of payment history, appraised value, loan to value ratio, comparable transaction details, comparable property defaults or value changes or risks, related financial instrument changes, or derivative contract data. The new data items regarding one or more of the financial products contracts can relate to one or more of the following types of risks: asset valuation, bankruptcy, credit, currency, changes in sentiment, counterparty, country, definitional (absence of standardization), diversification, economic (Inflation, recession and interest rates—yield curve), environmental, liquidity, litigation, market crash, moral hazard, performance or operating risk, spread, terrorism or war, transaction, transfer, transparency, volatility, or volumes.

In one embodiment, the financial products contracts comprise credit derivative swap contracts; and the new data items may disclose changes in related financial products, or defaults in related financial products.

The one or more computer programs perform calculations with respect to the new data items to determine risk conditions; and add to or modify the data report to create a risk updated data report incorporating determined risk conditions, which are preferably identified in the apparatus with risk condition data tags. Preferably, the risk conditions are determined relative to predetermined standards but, with newly understood risks constantly being identified, the use of overlays of relational risk-identifying databases can be useful, indeed necessary.

This data can then be used to calculate value, either by using financial analysis tools, or by making a comparison to one or more comparable instruments having a known value or related risk. The process is the same for each type of financial risk. Real valuations may be established by linking different accounting/jurisprudential/regulatory standards, contract types, valuations by "comparable asset types" and anticipated cash flows, overlays of different databases detailing any form of risk-related subjects. The latter would include everything from comparisons of operating metrics that measure different type of operating performance risks on a per platform basis (as measured by: conversion/pull-through rates), to value or risk-related information like appraisals, medical histories, mortality rates, diet and exercise, economic or geographic or geologic information, etc.

Although the conceptual framework applied is consistent across all financial products contracts, the valuation approach will vary by asset type or product grouping. Thus the valuation of instruments derived from cash markets will apply different standards than the valuation of instruments derived from mortgage markets or insurance markets. In the same way, cash instruments, futures instruments, and option instruments will all have separate valuation approaches.

The data reports are continuously updated to reflect changes arising from external events or from the subsequent transactions. The data reports can be made available to parties in either a primary or secondary market for the financial products. In one preferred embodiment, one or more computer programs executing on the data processing system determine if a person has provided data elements regarding financial products contracts to the data processing system and calculate a system credit related to a quantity of data elements provided by the person. The system credit may be applied by the person to a cost of obtaining data reports from the data processing system.

The data processing systems 101 to be most effective should collect data from a range of sources, including originators, purchasers, rating agencies, regulators, data providers on trends and relationships between factors and affected elements, for example, in connection with weather, calendar, medical, location, and other conditions. It is desirable therefore to incorporate one or more mechanisms that prime an efficient market and that reinforce the efficiency of the market. Three illustrative mechanisms are:

First, where the data processing system 101 constitutes an offering/closing system or exchange for the sale of financial products, the pro rata fees incurred with respect to transactions associated with a patron for patronizing the system might decrease as the total fees incurred by transactions associated with that patron increase. For example, although the owner/operator of data processing system 101 might receive a fee from a lender/insurer when the lender/insurer closes a loan or writes an insurance policy through the system, a portion of the fee might be remitted back to the lender/insurer for having closed a large volume of business through the system in a given interval. Advantageously, the fees from all types of loans, lines of credit and/or insurance policies are aggregated for determining the amount of the remittance.

Therefore, this mechanism encourages lenders/insurers to patronize the system with larger, rather than smaller, volumes, which is accomplished by endeavoring to offer the most varieties of loans, lines of credit, or insurance at the lowest interest rates or insurance premiums and at the best possible terms.

Second, some or all of the parties who patronize the system might receive statistics compiled by the system on the condition of the market in loans, lines of credit, and/or insurance products. Although these statistics cost the owner/operator of data processing system 101 little to compile, their value is so great that lenders, insurers, reinsurers, reinsureds and buyers and/or sellers of loans who do not have access to the statistics will have difficulty, in the long run, in competing with those who do. An analogy makes the situation clear; a trader of stocks without access to the stock ticker and current bid and offer quotations can be arbitraged by a trader who does.

Furthermore, although some or all of the statistics might be sold for cash, the statistics are advantageously given for free, or sold at a subsidized price, to those patrons of the system who actually disclose necessary data in the system. Advantageously, the price for the statistics decreases as the measure of fees incurred by transactions associated with a patron increases. For the purposes of this specification, the provision of statistics for free, or at a subsidized price, to those patrons of the system who close loans, buy and/or sell loans, write insurance policies, and/or reinsure risks or both through the system is called "netbacking."

Netbacking also encourages lenders/insurers, as well as individual borrowers and insureds, to patronize the system with larger, rather than smaller, volumes, which is accomplished by endeavoring to offer the most varieties of loans, lines of credit, or insurance at the lowest interest rates or insurance premiums and at the best possible terms.

Third, a portion of the fees incurred with respect to transactions associated with a lender for lending through data processing system 101, or with an insurer for writing policies to insurance applicants, might be credited against the fees incurred with respect to transactions associated with the lender for buying and/or selling loans through the system, or with respect to reinsurance transactions (as either buyer, seller, reinsurer and/or reinsured). For example, many lenders desire to sell a loan immediately after they have made it, and many insurers who write policies immediately seek reinsurance (i.e., to transfer all, or a portion of, the risk associated with the policy to a reinsurer). It is, therefore, possible that a lender/insurer will lend to an applicant or write a policy through the system, and incur a fee for doing so, and then sell that loan or reinsure that policy through the system and incur a second fee. Data processing system 101 credits, according to some credit schedule, a portion of the fees associated with a patron for lending or writing insurance through the system against the fees incurred for buying or selling a loan or for reinsuring through the system.

An alternative embodiment, in the loan context, works in reverse and credits, according to some schedule, a portion of the fees incurred with respect to transactions associated with a patron who buys and/or sells loans through the system against the fees incurred for lending through the system. In the insurance context, this alternative embodiment works in reverse and credits, according to some schedule, a portion of the fees earned with respect to a patron in reinsuring through the system against the fees incurred by the patron in a transaction for writing insurance through the system. In yet another embodiment, in the loan context, the fees incurred in buying and/or selling loans through the system are credited against the fees for lending through the system, and the fees incurred for lending through the system are credited against the fees for buying and/or selling loans through the system. In yet another embodiment, in the insurance context, the fees incurred in reinsuring through the system are credited against the fees for writing insurance through the system, and the fees incurred writing insurance through the system are credited against the fees for reinsuring through the system.

These structures encourage lenders/insurers to patronize the system with larger, rather than smaller, volumes, and to offer the most varieties of loans, lines of credit, or insurance at the lowest interest rates or insurance premiums and at the best possible terms, and by patronizing the secondary market in loans or reinsurance with the best possible bids and offers.

The end result is that in order to compete in the consumer finance and/or insurance markets, lenders, buyers and/or sellers of loans, insurers, reinsurers and/or reinsureds must have access to the statistics, which encourages them to patronize the system with competitive offerings to get access to the statistics, which increases the competitiveness of the market, increases its volume, and promotes its efficiency. Therefore, some embodiments prime the market for efficiency and incorporate a positive feedback mechanism that maintains that efficiency. It is understood, however, that the priming of embodiments might be assisted by advertising and other marketing techniques.

Data processing system 101 may receive data from each lender, applicant, application processor, loan processor, buyer and/or seller of loans, insurer, reinsurer, reinsured, insurance agent and/or underwriter, and in some embodiments, endeavors to match lenders/insurers with appropriate applicants and reinsurers with appropriate reinsureds, to facilitate the provision of loans and lines of credit. Each lender, applicant, application processor, loan processor, buyer and/or seller of loans, insurer, reinsurer, reinsured, insurance agent and/or underwriter is advantageously capable of providing data to and receiving data from data processing system 101 via a data network (e.g., the Internet, etc.) or via a telephone network (e.g., the Public Switched Telephone Network, etc.) or both.

Referring again to FIG. 2, it depicts an illustrative embodiment of data processing system 101, which illustrates the updating of data reports with new data items and the earning of a system credit from submission of new data items.

The invention includes the following advantages:
data processing system 101 can provide buyers and sellers of loans with statistics regarding the market in pools of loans, which can be used by the buyers and/or sellers of loans to: (1) assess the value of an individual loan, (2) assess the value of a loan or pool of loans, (3) determine which types of loans they desire to buy and sell, and (4); arbitrage those buyers and/or sellers, reinsurers, and/or reinsureds who do not have access to the statistics.
data processing system 101 may provide reinsurers, and/or reinsureds with statistics regarding the market in insurance and reinsurance that are of value in: (1) assessing the cost/value of individual policies that are to be reinsured; (2) determining which policies they desire to reinsure and at what price, and (3) arbitraging those reinsurers and/or reinsureds who do not have access to the statistics.
data processing system 101 may provide buyers and/or sellers with an efficient market for the purchase and sale of the servicing of pools of loans (e.g., providing payment collection and other administrative overhead, etc.).
data processing system broadly provides an efficiently priced market by allowing for transaction fees to wholly or partially offset one another or have either offset access to strategically critical market information—even prospectively across asset classes and product lines.

These inducements are possible because the costs of doing business for lenders, insurers, reinsurers, reinsureds and buyers and/or sellers of loans and the interest rates or insurance premiums and fees to applicants are unnecessarily high because efficient markets for loans, lines of credit, insurance and reinsurance do not exist. Furthermore, if a highly efficient market for loans, lines of credit, insurance and reinsurance did exist, the cost of doing business for lenders, insurers, reinsurers, reinsureds and buyers and/or sellers of loans could decrease, the interest rates or insurance premiums and fees to applicants could decrease, and the provider of the market could also make a profit. Furthermore, the existence of an efficient market could even provide lenders/insurers with a larger profit than they make now if operating costs drop more quickly than interest rates or insurance premiums drop. In other words, the intermediation of an efficient market between applicants, lenders, insurers, reinsurers, reinsureds and buyers and/or sellers of loans can actually make the cost of loans, lines of credit, or insurance to applicants go down, the cost of doing business to lenders, insurers, reinsurers, reinsureds and buyers and/or sellers of loans go down and the profits to lenders, insurers, reinsurers, reinsureds and buyers and/or sellers of loans go up. Therefore, data processing system 101 endeavors to provide a market for the provision of loans, lines of credit, insurance and reinsurance that is highly efficient.

The efficiency of the market for loans, lines of credit and/or insurance (the primary or retail market) may be affected by the efficiency of the market in pools of loans and/or reinsurance (the secondary or wholesale market) and vice versa. Therefore, data processing system 101 may improve the efficiency of both the primary market and the secondary market so that, to the extent the efficiency in one enhances the efficiency in the other, a synergy of efficiency between the two markets is affected. For example, to effect this synergy, fees incurred by a patron to the owner/operator of data processing system 101 for lending through the primary market might be credited against the fees incurred by the patron to the owner/operator of data processing system 101 for buying and/or selling through the secondary market (and vice versa).

In one embodiment, the solution involves a universal Transaction Credit system credit that conveys an economic benefit, displayed electronically, that fosters the development of an "Infomediary" that carries the necessary data and analytics to clarify the marketplace. This credit may be used to support an effective utility, thus offering a more efficient and volume-enhancing electronic distribution network for a full range of financial products, including financial products that impact all forms of risk transfer. The result gives clear, economic and strategic advantage to the system user and induces usage generating business volumes.

This technology can be superimposed on an existing, de facto marketplace, singly or in a serial fashion to create a virtual community of interests, a truly collaborative effort that accesses all necessary capital pools. It can be easily organized using today's technology and financial skills at low cost relative to any other solution, open to all, enhancing and linking—but not disturbing—all sectors and transaction platforms in the marketplace. It is an approach that is entirely optional and voluntary, in which all participants trade transparency-related information for lower costs.

Attributes of the system include:
(1) It is neutral—it does not favor any one special interest group or constituency.
(2) It is internet-focused (thereby creating widest market reach).
(3) It focuses on underwriting standards and associated transaction-related statistics, inclusive of terms and conditions, representations and warranties.
(4) It provides its own economic and strategic benefits.

(5) It is transparency-inducing, without being transparency-requiring (each counterpart does precisely what they choose, in terms of disclosing their unique circumstance and paying an appropriate price).
(6) It delivers increasingly granular real-time data and analytics for all financial products with primary and secondary markets.
(7) It is the lowest-cost method relative to all other solutions.
(8) It is entirely volitional.
(9) It carries the benefit of both organic and viral growth (caused by the fact that trade participants always lower costs, gain revenues and market share; whereas non-participants lose).
(10) The public demonstrably wins through better pricing of goods and services.
(11) It is easily adaptable to all current transaction platforms and technology.
(12) It can be initiated almost overnight, simply by executive mandate.
(13) It provides a stimulus (made clearest through an electronic display of transaction credits) without any inflationary risk.
(14) It facilitates easy entry and exit of new product/services.
(15) It does not require additional expansion of government functions or bureaucracy.
(16) It is a private market solution; an American innovation.
(17) It tracks all market transactions, and forms a low-to-no-cost audit trail.
(18) It could look like a Government Sponsored Enterprise that sponsors transparency, not needing to make financial guarantees, simply validating that the information is disclosed anonymously but with accuracy guaranteed.
(19) It can predict, mitigate and, possibly, avoid risk.
(20) It is capable of presenting as a dedicated search engine for Financial Services.
(21) It is "friendly" to and compatible with all sectors.
(22) It encourages massive market growth of all types of risk transfer instruments and securities.

The present invention focuses on giving individual financial product characteristics a more ordered methodology for valuation analysis. In loans and lines of credit, insurance and reinsurance, and in related derivative products, the system has looked at the creation of basic approaches to determine valuation and to track the performance on both a past and a going forward basis in the resulting product placements.

The system puts all financial products through a common sieve, through a funnel that measures the attributes that are associated with each data report and system credit, whereby one can measure the attributes of each transaction against the same or similar attributes of other transactions, then the entire structure and the placement of each product all becomes much more efficient.

An electronic database may display and cross reference all elements relevant to product and/or policy issuance, including, without limitation: volumes, by broad product type or sub group, by region, by time, price, terms, type of counterpart, etc.; operating metrics; audit trails; and, in time, both granular and high level risk performance by insurance product or insured type analyzed as far down as performance on the individual policy level offering progressively more "granular" information leading to increasingly refined product views. Over time the emphasis of the analytics may shift from improving operational and volume performance to focus on strategic benefits, product positioning, transaction patterns, and risk analysis.

The solution of the present invention tracks the composition of the assets or financial instruments and details of transactions as they occur. If it was paper we would put paper clips or "post-it" notes on all or certain pages of the documents where critical information is to be found. Instead, imagine a Transaction Credit system credit was "stuck" onto each electronic file containing the details of a transaction. The Transaction Credit system credit has at least five valuable features:

It provides economic value in that it can be used to offset future transaction fees, and/or to offset the cost of acquiring transaction and market data.

It provides incentives to conduct repeat business as participants are more likely to use a credit with real value. The credits also have terms—the precise definition of which can be used to induce usage.

It is tradeable.

It is structured to reduce cost of regulatory compliance. Financial service regulators would find the concept of the credits intriguing because reviewing a flow of credits reveals market sector activity by business volumes, and product demand on an increasingly granular basis. The database provides insight into progressively more detailed information that otherwise must be collected through a much more labor intensive, time consuming and costly process of on-site examination and review of the regulated businesses.

It is a tightly-focused new tool for public policy, a clearly non-inflationary economic stimulus, with immediate application. A Transaction Credit system credit "grafts" to any transaction platform or technology and immediately targets "search" functions. It is searchable. A search engine can search credits in order to determine "best pricing" and/or an appropriate or preferred match. A search engine can search for attributes or terms of financial products.

The present invention presents a data processing platform that is truly transparent, inclusive of all origination, distribution and investment entities. This structure allows for comparative analysis across markets, transaction platforms, and products, in real-time and inclusive of actual up-to-date investment performance. The full process of Illuminating financial markets is long overdue. It is necessary to re-build the marketplace from a dependence on opaque 20th century artificial structures to a reality-based 21st century system where value can be assessed as previously hidden risk descriptions and associated cash flows are each unlocked.

As discussed, credit markets and financial markets are presently opaque. As a result, one critical issue is risk detection/assessment and, with this, appropriate financial valuation. Information currently lags, or can be hoarded, preventing valuation on the most granular per financial contract/asset basis. This is one form of informational asymmetry and, as a consequence, there is financial illiquidity in the marketplace.

To address this, the transparency-inducing system disclosed herein infuses markets with risk-illuminating information that facilitates market function, liquidity, risk tracking and the performance and sanctity of a contract. This can occur with near-real-time updates of a broad range of risk-containing contractual elements, inclusive of those that detail operating conversion/pull-throughs at specific points in the origination or intermediation process. This provides a comprehensive and encompassing (of all market participants and engines) solution to the current financial crisis.

It is appreciated that flat, Gaussian mathematics-based analytics of risk data can be inherently flawed. Risk actually occurs elliptically, with an associated need to capture, display and analyze information according to its precise incidence and updated Bayesian experience (along with qualitative elements, such as the intensity of data) throughout the full life cycle of all perils. As a result, it is necessary to create an effective risk-differentiating "ticker tape" on all contracts and any derivatives products that will include real time tracking.

This system disclosed herein is designed to encompass any portion of, or the full spectrum of, a contract's lifecycle. For example, from loan origination, and the first inquiry by a consumer or credit seeker, to the final maturity, or end disposition. The information that describes the origination of a loan and all related risk and valuation data may be entered into the system and becomes transparent and trackable. These defining risk parameters of each loan can be provided or displayed anonymously, in real-time or near real-time. Such information may also always be accessible to all market participants, including regulators, rating agencies, investors and market makers.

The risk data provided to the system can be accessed to take as macro or micro a view of overall market or product-specific or transaction-specific information or risk-element-specific data as the user desires. A lender's underwriting standards describe the risk that he is willing to take, and which can be shifted to others downstream. The loan documents further specify the obligations of each counter-party to the financial contract. This data will always be accessible no matter what happens to the loan—even if it gets sliced and diced into derivative products that use only a portion of the original loan instrument.

As the loan ages, its performance is tracked and its risk updated. The performance (in terms of actual cash flows) and other related risk data is stored in the database. Each descriptive element and any status or price changes may be embedded and stored in a "Transaction Credit," although not limited thereto. The Transaction Credit, in turn, has direct financial benefit to the participant. Thus, all market participants have the optional ability to "trade" transparency in exchange for lower costs. A Transaction Credit is a unique, anonymous identifier that can be applied to reduce the cost of future transactions, or of strategically important market information.

The Transaction Credit also serves as a tracking device. Transaction credits continuously add information and value, even as the loan ages, enhancing liquidity and powering business volumes. This unique tool provides incentive for participation and tracking risk characteristics of each instrument.

A reporting mechanism acts as a "living contract" that updates history along with data capture of all risk elements from first inquiry to final contract disposition. The data capture and risk analytics may focus on near real-time comparative conversion/pull-through metrics at each process point in the origination and intermediation of all contracts and any of their aggregations.

The "living contract" combines and resolves all ontology and taxonomy issues that can result in regulatory, accounting, jurisprudential or regulatory arbitrage, with specific and cross-reference views on operating metrics, risk-defining contractual elements, informational updates (at least coincident with each intermediation), per-contract cash flow performance reviews as they occur, and the diversification of credit risks with those risks (such as natural catastrophic disaster) that do not positively correlate to credit—plus an ability to mine differing risk databases of all non-correlating risks.

This information may be presented in a manner that facilitates risk-specific and risk-differentiated cash, futures, options and associated indices, as well as the coincident arbitrage between these markets. At each point along the way: Data is collected, linked and tracked; Data is viewed in real time; Transaction Credits may be earned—reducing costs.

All of the above may utilize: time-stamping, unique encoded (per risk) identifiers, both veracity gradings by some acceptable scale and sourcing of judgment statements (by counterparts, processors, outsourcers, investment banks, etc.), as well as real-time per contract/asset valuations of comparable risks—to create an online ticker tape, supported by the "living contract."

Some risks which may be disclosed in this process include, but are not limited to: Asset valuation, Bankruptcy, Credit, Currency, Changes in sentiment, Counterparty, Country, Definitions (Absence of standardization), Diversification of risk, Economic (Inflation, recession and interest rates—yield curve), Environmental, Liquidity, Litigation, Market crashes, Moral Hazard, Performance/Operating risk, Spread, Terrorism/war, Transaction, Transfer, Transparency (i.e. Price and term discovery), Volatility, Volumes (i.e. price discontinuity by transaction amount or "size"), underwriting standards, and Terms and conditions.

As a loan is held in an investment pool, the details of the individual loans and pricing characteristics must be fully and accurately known and described. Today, this information is difficult, if not impossible to obtain. But in the system disclosed herein, any loan within the portfolio can be made fully transparent down to the key data risk elements. The precise original underwriting standard can be accessed and compared against other risks. And those data points can be used to create new informational or investment products. Wherever it goes, no matter how many times it is repackaged and resold, the data associated with that loan remains in the data processing system, fully transparent for all market participants.

Participants can view in the system the data of the specific loan, lending activity in the retail market, and transactional activity in the secondary market and all related risks. Participants can compare performance of the loan, and of all related products based off of it. Thus, regulators can detect disturbing market trends as they emerge. This may empower regulators to oversee transparent markets without the need for regulation.

Over time, a rich repository of market data is formed. The display of data in real time creates a "ticker tape" on the markets for loans and lines of credit, which has never existed before. This enables price discovery and the tracking and establishment of asset values. It provides a methodology of ascribing reliable asset values and credit ratings to securitized and structured products. This in turn creates more efficient markets by exposing differences in market pricing, which both provides arbitrage opportunities, but at the same time limits excessive arbitrage, and spreads through competition, leading to more robust financial markets.

Timely access to loan data, compared across transaction platforms, can be used to identify particular bellwether events such as systemic risks and concentrated counterparty risks, shifts in borrowing activity, loan repayments, refinancing activity, or resale of derivative risks and much more. Participants can track and model these data points to assess the actual performance and risk profile of assets.

The system facilitates identification of impending toxic trends, excessive inventory by loan type and other warning signs, thereby "connecting the dots" to form a comprehensive view of systemic risk. With this information in hand, the owner, investor, evaluator or regulator can take the appropriate steps to manage the risk.

The only way to grow such a complex marketplace is to enhance the product creation process and to assure that the risks are both appropriately measured and "costed" to the intended investment result. In this way, it is possible for the product origination process and the anticipated financial performance of each contract to secure the marketplace.

A frank and transparent identification and grading of all contractual and associated risks in product creation enables growth of the financial markets—massively. Once that identification and grading (i.e., standardization) is complete, we can price the risks openly, out of a more complete understanding of the likely incidence of each defined peril. The full disclosure across a product's life cycle, induced by incentives that reduce costs or increase market advantage, provides the financial system with a stronger foundation.

The ability to view risk data electronically in near or real-time from both macro and micro views is particularly useful when it is necessary to value complex, rarely traded and unique aggregations of contracts, such as those that commonly occur in both the property-casualty sectors of insurance and the structured finance sector of capital markets. The ability to review, compare and contrast macro-to-micro views of risk-disclosing, value-impacting information such as that disclosed herein has not heretofore been captured or displayed across the full life cycle of each financial contract or aggregation in near- or real-time.

It facilitates the entry/exit of new products and creates new forms of currency. Further, it restores confidence in a level playing field in financial services, demonstrably lowers costs for all participants, measures and compares risks and values electronically.

Figure 3:
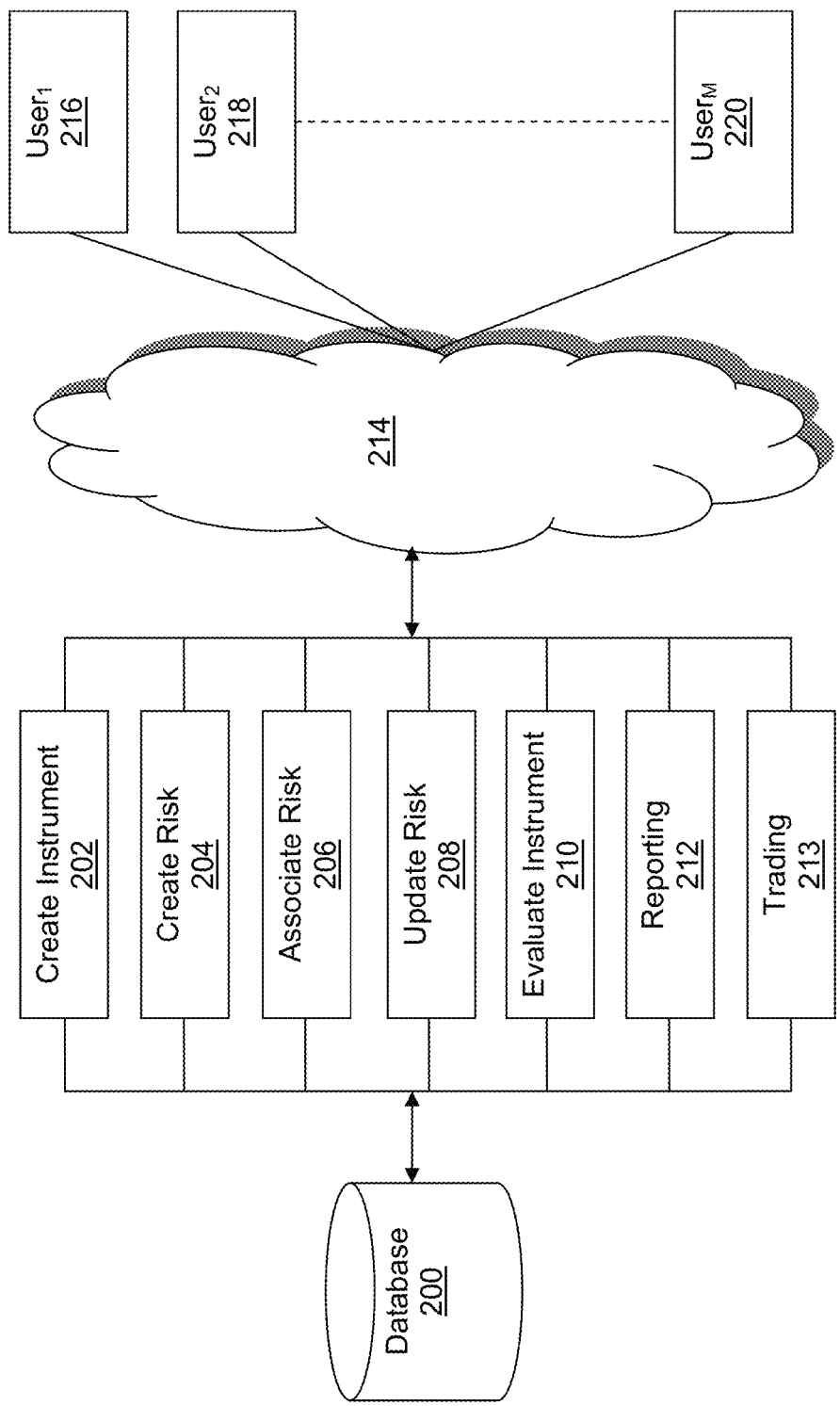
FIG. 3 is a schematic block diagram depicting one embodiment of the system according to the present teachings.

Referring now to FIG. 3, shown is a schematic block diagram depicting one embodiment of the system according to the present teachings. The system may comprise numerous pieces of software executing on computer readable media that interact with a database 200 to store, retrieve, and manipulate data for users 216, 218, 220 through a network 214. In one embodiment, although not limited thereto, the network 214 may be the Internet and the system may comprise a general user interface which allows users to access the system through a website. In this way, users can have real-time access to market data anytime and from anywhere.

The system may comprise the following pieces of software executing on computer readable media, although not limited thereto: instrument creating software 202 for creating financial instrument data records and storing them in the database; risk creating software 204 for creating risk data records and storing them in the database; risk association software 206 for associating risk data records with financial instrument data records; risk updating software 208 for updating risk data records (e.g., risk value, etc.); financial instrument evaluation software 210 for evaluating the value of a financial instrument based at least in part on any associated risks; reporting software 212 for reporting data related to financial instrument data records and/or risk data records; and trading software 213 for trading financial instruments.

It is to be appreciated that the risk creating software 204 may create risk data records, store them in the database, and associate them with financial instrument records without the need for risk associating software 206, although not limited thereto. In addition, while risk updating software 208 may be used to update risk associated with a financial instrument, it may be preferable to create new risk data records, thereby keeping a record of the change in risk (and risk value) over the life of a financial instrument.

Following is one exemplary embodiment of a financial instrument data record schema, although not limited thereto:

| Title | Type | Market | Owner | Transparency Index | Instrument Value ($) |
|---|---|---|---|---|---|
| VA-90991 | Mortgage | Primary residential | John Smith | 78% | $400,000 |
| TV-887 | Line of credit | Primary home equity | Cathy Newman | 98% | $45,000 |
| TX-0001 | Life insurance | Primary insurance | Sarah Velo | 45% | $600,000 |

Each financial instrument data record may have associated with it a number of risk data records. The quantity and quality of the associated risks may be used to calculate a transparency index of a financial instrument, although not limited thereto. For example, a particular type of instrument may have a set of standard risks, the disclosure of which yields a certain level of transparency. Following is one exemplary embodiment of a risk data record schema, although not limited thereto:

| Financial Instrument | Date | Type | Current Risk Value | Disclosing Party |
|---|---|---|---|---|
| VA-90991 | Mar. 7, 2010 | Loan to value | .8 | AMM, Inc. |
| VA-90991 | Mar. 7, 2010 | Appraisal | $500,000 | AMM, Inc. |
| TX-0001 | Jan. 1, 2007 | Age | 23 | Acme Insurance |
| TV-887 | Feb. 12, 2009 | Credit rating | 680 | AAA Credit |
| TV-887 | Feb. 12, 2009 | Comparable transaction rating | .5 | |
| VA-90991 | Nov. 19, 2009 | Portfolio diversification of owner | .8 | ABC Mortgage |
| VA-90991 | Nov. 19, 2009 | Environmental catastrophe risk rating | .9 | ABC Mortgage |
| TX-0001 | Jul. 22, 2008 | Market economic indicators | 1 | Acme Insurance |

Using disclosed risk information such as this, it is possible to calculate a monetary value of each particular risk and, consequently, a financial instrument having multiple associated risks.

For example, and without limitation, a mortgage company who issues a $400,000 mortgage on a $500,000 house (e.g., loan to value 80%) may calculate that the monetary value of that particular risk as $100,000. However, if a subsequent appraisal values the house above $500,000, or if the particular geographic region where the house is located sees an increase in property values, the value of the financial instrument may increase since the overall liability is lowered. It is to be appreciated that the embodiments presented herein are exemplary and not limiting. The system of the present teachings may calculate a monetary value on any number of different types of risks, both credit and otherwise, in order to provide an open and accessible system of risk disclosure and evaluation of financial instruments.

One objective of the system according to the present teachings is to provide the ability to capture and value non-credit risks. For example, whether a mortgaged house in a flood zone, the diversification of an issuing bank, etc., all affect the value of financial instruments and their tracking and valuation provides incredible value to users of the system.

The creator of a financial instrument not only discloses all of the risks that may be used to value the instrument, but those risks can be updated as necessary by creating new associated risk data records. Risk data records may have a date/time stamp in order to determine whether they are current and the change in risk can be tracked during the life of a financial instrument. The associated risk data records allow a real-time or near-real-time calculation of a financial instrument's value by users of the system.

The reporting software 212 may be able to report on any attributes of risk data records and/or financial instrument data records, although not limited thereto, from the broadest view to the most granular. For example, in one embodiment it is possible to report on a financial instrument and then see each associated risk. In another, it may be preferable to report on all "loan to value" type risks to see how much risk is in the marketplace should there be a downturn in real estate values. Similarly, it may be preferable to report on all financial instruments in a particular portfolio, owned by a particular entity, or all "mortgage" type instruments, although not limited thereto. It is to be appreciated that any number of different reporting options are possible with the present teachings and it is not limited to these particular embodiments.

Figure 4:
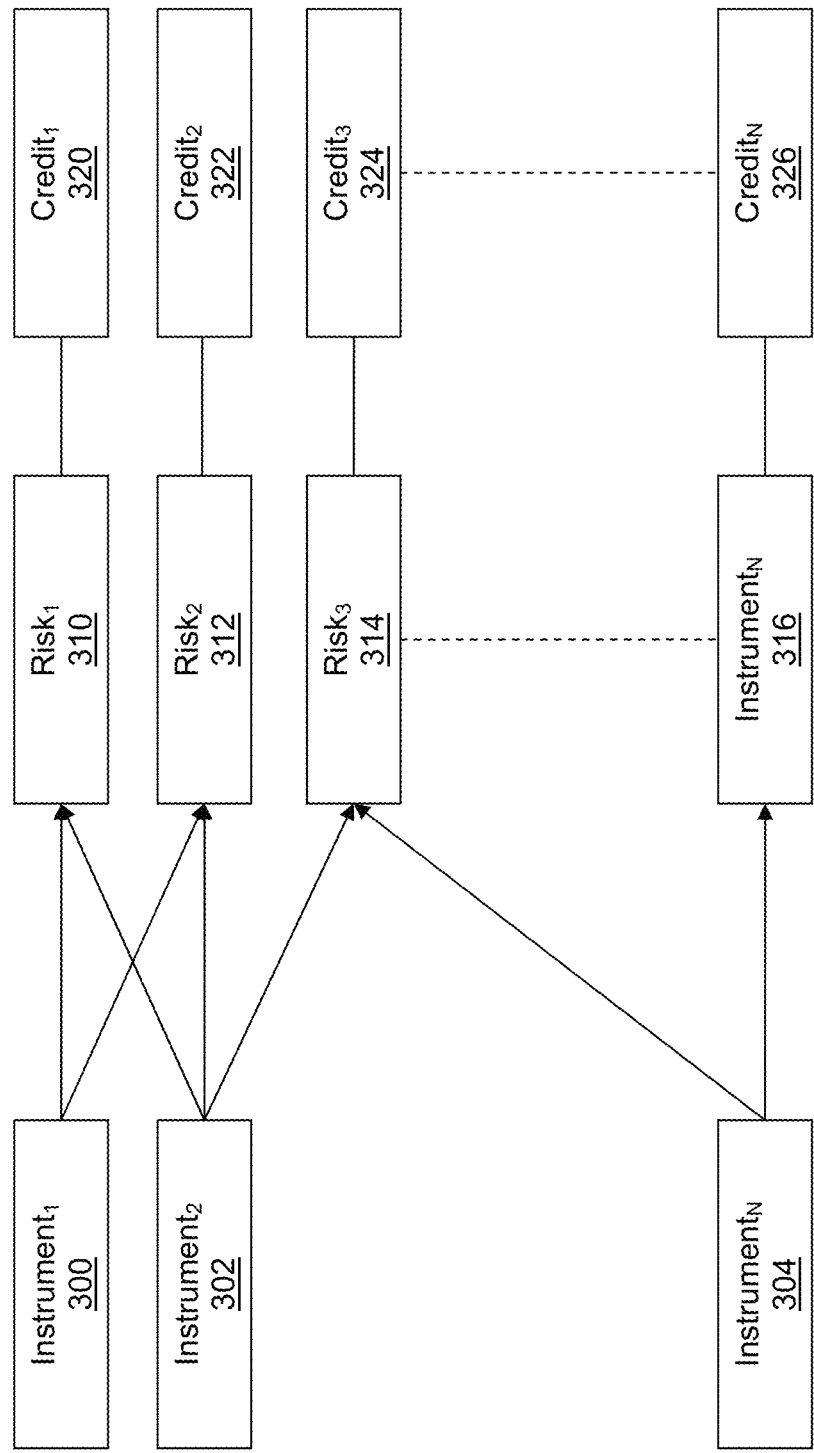
FIG. 4 is a schematic block diagram depicting one embodiment of data association according to the present teachings.

Referring now to FIG. 4, shown is a schematic block diagram depicting one embodiment of data association according to the present teachings. As shown, each financial instrument 300, 302, 304 can be associated with one or more risks 310, 312, 314, 316. As an example, a lender may create a mortgage loan financial instrument 300. When doing so, the lender may provide information on the risks 310, 312 associated with that loan (e.g., underwriting standards, loan-to-value, appraisal value, borrower's payment history, title search, etc.). It is appreciated that any financial instrument may be used with the system disclosed herein and any number of different types of risks may be used to evaluate an instrument, and the current teachings are not limited the particular embodiments provided.

Using the system's reporting mechanism it is possible to detect trends. In one example, although not limited thereto, it may be helpful to ascertain all loan to values for mortgages issued by a certain bank to a certain zip code. If all loan to values are over a certain percentage, say the average for the industry in that zip code, this may indicate fraudulent activity by the bank in order to issue mortgages. The reporting mechanism of the system can report risk and financial instrument information across a variety of different attributes including, although not limited thereto, entity, market, segment, geographic location, risk type, financial instrument type, etc. In another example, this reporting mechanism allows a regulator to identity all risks a certain entity possesses, such as an issuing bank, in order to calculate that bank's overall liability, although not limited thereto.

The disclosure of risks 310, 312 permits real-time valuation of the loan by instrument evaluation software 210 (shown in FIG. 3), even though risks (e.g., risk values, etc.) may change during the life of the instrument. This also provides the ability to compare similar instruments. A proper valuation of a financial instrument can be determined at any given time, which may be accessible by all other market participants, leveling the playing field and increasing the liquidity of the market. Algorithms may be employed to determine value based upon the relative weight and/or calculated risk value of any risk, although not limited thereto. One embodiment of the relative weights of risk is presented in the table below, although the present teachings are not limited to this particular embodiment:

| Risk | Calculated Risk Value | Relative Weight |
|------|----------------------|-----------------|
| $Risk_1$ | $25,000 | .2 |
| $Risk_2$ | $15,000 | 1 |
| $Risk_3$ | $30,000 | .8 |

During the life of the instrument, the risks associated with the instrument may change, such as loan terms and other factors. Risks can be updated by risk updating software 208 (shown in FIG. 3) or by adding new risk data records. Financial instruments may be repackaged, resold and sliced and diced in any number of different ways, which may occur on secondary markets. When this happens, only a portion of the original risk may travel with the new instrument. However, because risks are disclosed in the system, they can travel, or track, any instrument that incorporates those risks. As an example, shown in FIG. 4 a new instrument 302 may incorporate further risk(s) 314 to the risks 310, 312 associated with instrument 300.

Reporting software 212 (shown in FIG. 3) may permit users to access the wealth of market data in the system and report on instruments, risks, or any attributes associated thereto. This may be useful for regulators, for example, who may watch certain types of risks, industries, markets, sectors, portfolios, instruments, or any other piece or pieces of granular information to determine overall market changes. Instruments can be classified by type, geographic region, currency, originator, or any number of different attributes. Similarly, risks can be classified by type, time, related field, or any number of different types. This way, system users can access the wealth of information by any number of different attributes. This enables the identification of trends. Money can also be tracked using the system, which provides a solution to national security concerns regarding the flow of illicit funds.

In exchange for providing information on the risks 310, 312, 314, 316 associated with financial instruments 300, 302, 204, transaction credits 320, 322, 324, 326 may be earned. These credits may have value in and of themselves, for example, as payment for accessing reporting mechanisms in the system. In this way, a user can not only be compensated by disclosing all of the risks involved in a financial instrument, but those risks can be tracked in all subsequent instruments and the earned credits can be used or traded. This enhances liquidity since risks are disclosed and the veracity of any disclosure can be tracked back to the disclosing party. Credits may be tied to each risk, instrument and disclosing party, although not limited thereto.

Figure 5:
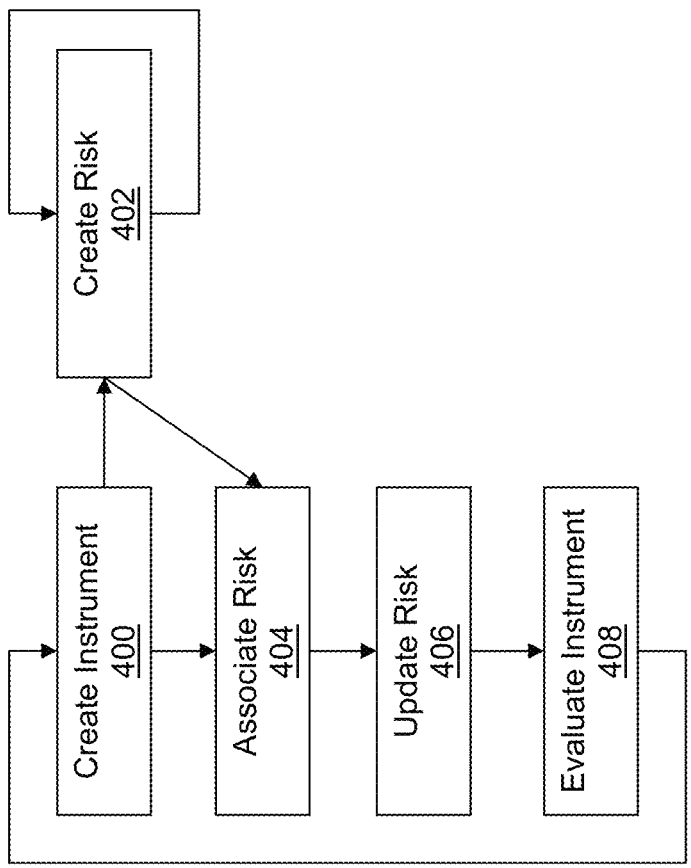
FIG. 5 is a flowchart depicting one embodiment of the method according to the present teachings.

Referring now to FIG. 5, shown is a flowchart depicting one embodiment of the method according to the present teachings. The following steps may be performed, although not limited thereto: create instrument(s) 400; create risk(s) 402; associate risk(s) with instrument(s) 404; update risks 406; and evaluate the value of the instrument 408, which may be done based on the disclosed risk(s). The steps may be repeated as necessary and in combination to create additional instruments, for example, where instruments are repackaged in secondary markets. The system may acts as a "clearing house" for settling transactions with comparable risks between users of the system. This way, financial instruments can be easily sold, repackaged and sold again, all while real-time value and associated risks are disclosed. The method may also include reporting data contained in the system to users (shown in FIG. 3).

While the present teachings have been described above in terms of specific embodiments, it is to be understood that they are not limited to these disclosed embodiments. Many modifications and other embodiments will come to mind to those skilled in the art to which this pertains, and which are intended to be and are covered by both this disclosure and the appended claims. It is intended that the scope of the present teachings should be determined by proper interpretation and construction of the appended claims and their legal equivalents, as understood by those of skill in the art relying upon the disclosure in this specification and the attached drawings.

What is claimed is:

1. A data processing system for evaluating financial instruments for users, comprising:
   one or more software executing computers, one or more data storage devices, and an output device;
   one or more databases stored on the one or more data storage devices;
   financial instrument data record creating software executing on the one or more software executing computers programmed to:
   create a financial instrument data record for an identified financial instrument and store it in the one or more databases;
   risk data record creating software executing on the one or more software executing computers programmed to:
   create a plurality of risk data records, stores them in the one or more databases, and associates them with the financial instrument data record, the plurality of risk data records each containing risk data used for calculating a current monetary value of the identified financial instrument;
   evaluation software executing on the one or more software executing computers programmed to:
   determine the current monetary value of the identified financial instrument, in real-time, based at least in part by calculating a monetary value of risk on each of the plurality of risk data records; and
   determine a transparency index of the identified financial instrument, the transparency index based at least in part on the quality of the plurality of risk data records and representing a measure of confidence in the current monetary value; and
   reporting software executing on the one or more software executing computers programmed to:
   receive at least one of a plurality of attributes associated with the identified financial instrument;
   identify other financial instruments with the same received at least one of a plurality of attributes; and
   output the current monetary value, the transparency index, and the identified other financial instruments as a comparison.

2. The system of claim 1 wherein the risk data stored in at least one of the plurality of risk data records is a non-credit risk.

3. The system of claim 1 further comprising software executing on a computer that creates a data record associated with a financial instrument data record when ownership of a financial instrument is changed among users of the system.

4. The system of claim 1 wherein the risk data comprises a risk value.

5. The system of claim 1 wherein the financial instrument creating software creates financial instrument data records for loans, lines of credit, or insurance contracts.

6. The system of claim 1 wherein the financial instrument creating software creates a financial instrument data record for a derivative financial instrument.

7. The system of claim 6 wherein a derivative instrument financial instrument data record is associated with at least one risk data record similar to or the same as a risk data record associated with its derived-from financial instrument.

8. The system of claim 1 wherein the risk data record creating software creates risk data records for risk data relating to: underwriting standards, financial terms, transaction platform information, exchange information, originator information, borrower information, appraised value, loan to value, comparable transaction information, diversification, economic indicators, environmental issues, liquidity, litigation, global conflicts, or market volatility.

9. The system of claim 1 wherein users disclose risk data used by the risk creating software in exchange for transaction credits.

10. The system of claim 9 wherein the transaction credits can be used to access system reporting features, obtain data from the system, and/or reduce other costs charged for use of the system.

11. The system of claim 9 wherein financial instrument records for derivative financial instruments are created based at least in part on the transaction credits.

12. The system of claim 1 wherein the transparency index is based at least in part on the quantity of associated risk data records.

13. The system of claim 1 wherein risk is updated by creating one or more risk data records with updated risk data that is used in the evaluation of any associated financial instrument.

14. A data processing system for evaluating financial instruments for users, comprising:
   one or more software executing computers, one or more data storage devices, and an output device;
   one or more databases stored on the one or more data storage devices;
   financial instrument data record creating software executing on the one or more software executing computers programmed to:
   create financial instrument data record for an identified financial instrument and store it in the one or more databases;
   risk data record creating software executing on the one or more software executing computers programmed to:
   create a plurality of risk data records, stores them in the one or more databases, and associates them with the financial instrument data record, the plurality of risk data records each containing risk data including a risk value for a non-credit risk;
   evaluation software executing on the one or more software executing computers programmed to:
   determine a current monetary value of the identified financial instrument, in real-time, based at least in part by calculating a monetary value of risk on each of the plurality of risk data records; and
   determine a transparency index of the identified financial instrument, the transparency index based at least in part on the quality of the plurality of risk data records and representing a measure of confidence in the current monetary value; and
   reporting software executing on the one or more software executing computers programmed to:
   receive at least one of a plurality of attributes associated with the identified financial instrument;

identify other financial instruments with the same received at least one of a plurality of attributes; and output the current monetary value, the transparency index, and the identified other financial instruments as a comparison.

15. The data processing system of claim 14 wherein the risk data record creating software creates risk data records for risk data relating to:

comparable transaction information, diversification, economic indicators, environmental issues, liquidity, litigation, global conflicts, or market volatility.

16. The data processing system of claim 14, wherein the financial instrument creating software creates financial instrument data records for loans, lines of credit, or insurance contracts.

17. The data processing system of claim 14, wherein the financial instrument creating software creates a financial instrument data record for a derivative financial instrument.

18. The data processing system of claim 14, wherein the transparency index is based on the quantity of the associated risk data records.

19. The data processing system of claim 14, further comprising a transparency index data record creating software executing on a computer that creates a transparency index data record, stores it in the one or more databases, and associates it with the financial instrument data record.

20. A data processing system for evaluating financial instruments for users, comprising:

one or more software executing computers, one or more data storage devices, and an output device;

one or more databases stored on the one or more data storage devices;

financial instrument data record creating software executing on the one or more software executing computers programmed to:

create a financial instrument data record for an identified financial instrument and store it in the one or more databases;

risk data record creating software executing on the one or more software executing computers programmed to:

create a plurality of risk data records, stores them in the one or more databases, and associates them with the financial instrument data record, the plurality of risk data records each containing risk data including a risk value for a risk;

evaluation software executing on the one or more software executing computers programmed to:

determine a current monetary value of the identified financial instrument, in real-time, based at least in part by calculating a monetary value of risk on each of the plurality of risk data records; and determine a transparency index of the identified financial instrument, the transparency index based at least in part on the quality of the plurality of risk data records and representing a measure of confidence in the current monetary value; and reporting software executing on the one or more software executing computers programmed to:

receive at least one of a plurality of attributes associated with the identified financial instrument;

identify other financial instruments with the same received at least one of a plurality of attributes; and output the current monetary value, the transparency index, and the identified other financial instruments as a comparison.

21. The data processing system of claim 20 wherein the risk data record creating software creates risk data records for risk data relating to:

underwriting standards, financial terms, originator information, borrower information, appraised value, loan to value, comparable transaction information, diversification, economic indicators, environmental issues, liquidity, litigation, global conflicts, or market volatility.

22. The data processing system of claim 20, wherein the financial instrument creating software creates financial instrument data records for loans, lines of credit, or insurance contracts.

23. The data processing system of claim 20, wherein the financial instrument creating software creates a financial instrument data record for a derivative financial instrument.

24. The data processing system of claim 20, wherein the transparency index is based on the quantity of the associated risk data records.

25. The data processing system of claim 20, further comprising a transparency index data record creating software executing on a computer that creates a transparency index data record, stores it in the one or more databases, and associates it with the financial instrument data record for the identified financial instrument.

26. The system of claim 1 wherein the transparency index is represented as a percentage.

27. The system of claim 1 wherein the reporting software outputs information on each risk data record associated with the financial instrument.

28. The system of claim 1 wherein each risk is given a relative weight, and the evaluation software gives lower valuations to risks with lower relative weights.

29. The system of claim 1 wherein the evaluation software comprises at least two pieces of software executing on different computers.

* * * * *